US012109821B2

(12) United States Patent
Baba et al.

(10) Patent No.: US 12,109,821 B2
(45) Date of Patent: Oct. 8, 2024

(54) PRINTING APPARATUS AND PRINTING METHOD

(71) Applicant: CANON KABUSHIKI KAISHA, Tokyo (JP)

(72) Inventors: Naoko Baba, Kanagawa (JP); Satoshi Wada, Tokyo (JP); Yoshitomo Marumoto, Kanagawa (JP); Yuji Konno, Kanagawa (JP); Takeshi Yazawa, Kanagawa (JP); Shin Genta, Kanagawa (JP); Shingo Nishioka, Kanagawa (JP); Jumpei Jogo, Tokyo (JP); Takayuki Ushiyama, Chiba (JP); Keiji Kuriyama, Saitama (JP); Serena Yoshikawa, Kanagawa (JP); Taichi Yokokawa, Kanagawa (JP); Yumi Shimokodachi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 17/981,523

(22) Filed: Nov. 7, 2022

(65) Prior Publication Data

US 2023/0150270 A1 May 18, 2023

(30) Foreign Application Priority Data

Nov. 12, 2021 (JP) ................................. 2021-185117
Jun. 1, 2022 (JP) ................................. 2022-089481

(51) Int. Cl.
*B41J 2/21* (2006.01)

(52) U.S. Cl.
CPC ................................... *B41J 2/2103* (2013.01)

(58) Field of Classification Search
CPC ...... B41J 2/2103; B41J 2/2132; B41J 2/2114; B41J 2/2117
See application file for complete search history.

(56) References Cited

U.S. PATENT DOCUMENTS 8,807,698 B2 8/2014 Seki et al.
2009/0002414 A1 1/2009 Shibata et al.

FOREIGN PATENT DOCUMENTS

CN 113650418 A * 11/2021 ................ B41J 2/01
JP 2002-321349 A 11/2002

* cited by examiner

*Primary Examiner* — Justin Seo
(74) *Attorney, Agent, or Firm* — VENABLE LLP

(57) ABSTRACT

A printing apparatus performs control so that out of N scans for printing an image in a predetermined region on a print medium, a total application amount of a reactive liquid printed by first N/2 scans and a total application amount of the reactive liquid printed by second N/2 scans may be different between a case where an application amount of the reactive liquid per unit area which corresponds to the predetermined region is a first amount and a case where the application amount of the reactive liquid per unit area is a second amount larger than the first amount.

16 Claims, 19 Drawing Sheets

| NOZZLE ARRAY | MASK PATTERN ALLOCATED | INK APPLICATION AMOUNT |
|---|---|---|
| R1 | PRIOR PRINTING MASK | 2% |
| R2 | REGULAR PRINTING MASK | 0% |
| R3 | REGULAR PRINTING MASK | 0% |

FIG.13A

| NOZZLE ARRAY | MASK PATTERN ALLOCATED | INK APPLICATION AMOUNT |
|---|---|---|
| R1 | PRIOR PRINTING MASK | 10% |
| R2 | REGULAR PRINTING MASK | 5% |
| R3 | REGULAR PRINTING MASK | 5% |

FIG.13B

| NOZZLE ARRAY | MASK PATTERN ALLOCATED | INK APPLICATION AMOUNT |
|---|---|---|
| R1 | PRIOR PRINTING MASK | 0% |
| R2 | REGULAR PRINTING MASK | 20% |
| R3 | REGULAR PRINTING MASK | 20% |

FIG.13C

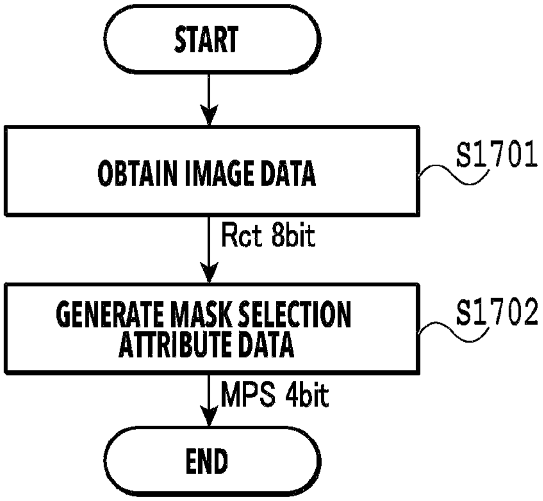
FIG.17A
| IMAGE DATA | MPS VALUE |
|---|---|
| 0 ~ 63 | 1 |
| 64 ~ 127 | 2 |
| 128 ~ 255 | 3 |
FIG.17B
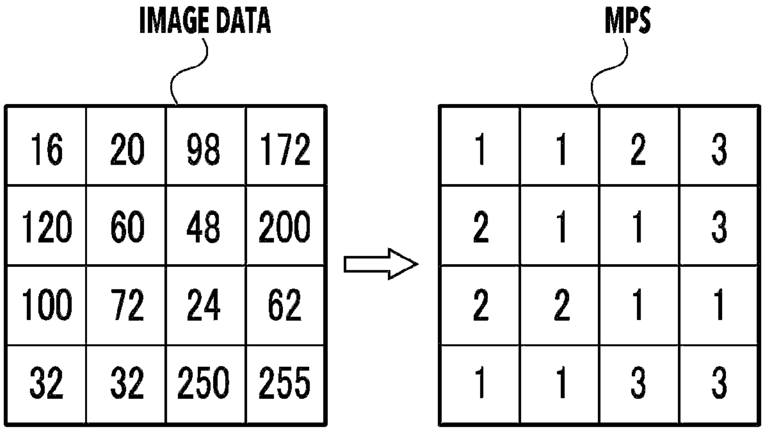
FIG.17C

PRINTING APPARATUS AND PRINTING METHOD

BACKGROUND OF THE INVENTION

Field of the Invention

The present disclosure relates to a technique for printing an image by performing a plurality of print scans with respect to a unit area using a reactive liquid.

Description of the Related Art

Inkjet printing apparatuses that print an image on a print medium by ejecting an ink to the print medium from a print head are known. In a case where such a printing apparatus forms an image on a print medium with low permeability, it is hard for an ink to permeate into the print medium, and the ink consequently accumulates on the print medium. Then, adjacent droplets of different color material inks contact each other, resulting in smear (hereinafter referred to as bleeding) between the droplets of the color material inks. A known approach to reduce this bleeding is to use a reactive liquid ink (hereinafter also referred to as a reactive liquid) that reacts with a color material contained in a color material ink. Specifically, bleeding is reduced by bringing a color material ink and a reactive liquid into contact with each other on a print medium and thereby causing, e.g., flocculation of a color material contained in the color material ink. However, applying the reactive liquid excessively causes over-flocculation with the color material and makes the resultant printed product less glossy. Japanese Patent Laid-Open No. 2002-321349 describes a technique of appropriately changing the application amount of a reactive liquid according to the application amount of a color material ink.

Also, for inkjet printing apparatuses, what is called a multi-pass printing method is known, in which all pixels in a region printable with a single scan are divided into a plurality of groups, and printing of the region is completed by a plurality of scans. There are also printing apparatuses that, in multi-pass printing, control the order in which to apply a color material ink and a reactive liquid. Completing application of a reactive liquid with scans fewer than a plurality of scans for applying a color material ink can increase the possibility of the color material ink coming into contact with the reactive liquid before bleeding between color material ink droplets occurs.

However, in a case where the application amount of a reactive liquid is increased due to an increase in the application amount of a color material ink, there is a possibility that, between droplets of a reactive liquid ejected beforehand, border portions of adjacent dots connect, forming connected dots (what is called beading). Beading would drastically degrade image quality.

SUMMARY OF THE INVENTION

A printing apparatus according to one aspect of the present invention is a printing apparatus including a first nozzle array having ejection ports configured to eject a color material ink and arranged in a sub scanning direction and a second nozzle array having ejection ports configured to eject a reactive liquid and arranged in the sub scanning direction, the printing apparatus printing an image in a predetermined region on a print medium by scanning the first nozzle array and the second nozzle array N times (where N is an integer of 2 or greater) in a main scanning direction intersecting with the sub scanning direction. Here, the printing apparatus includes a control unit configured to perform control so that out of the N scans for printing the image in the predetermined region on the print medium, a total application amount of the reactive liquid printed by first N/2 scans and a total application amount of the reactive liquid printed by second N/2 scans are different between a case where an application amount of the reactive liquid per unit area which corresponds to the predetermined region is a first amount and a case where the application amount of the reactive liquid per unit area is a second amount larger than the first amount.

Further features of the present invention will become apparent from the following description of exemplary embodiments with reference to the attached drawings.

BRIEF DESCRIPTION OF THE DRAWINGS

FIGS. 13A to 13C are diagrams each illustrating mask patterns allocated and an ink application amounts per unit area;

FIGS. 17A to 17C are diagrams showing an example of how a mask is selected based on reactive liquid data;

DESCRIPTION OF THE EMBODIMENTS

Figure 1:
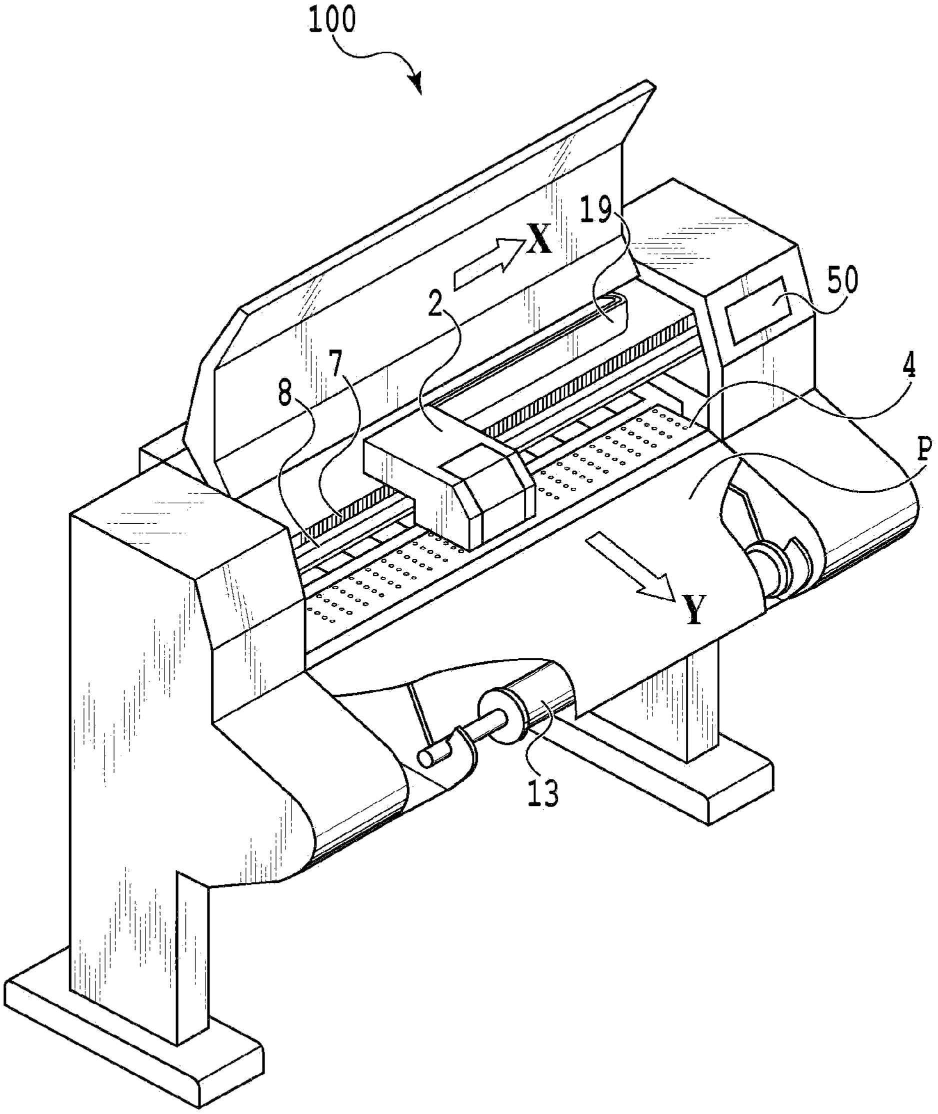
FIG. 1 is a diagram showing an outer appearance of a printing apparatus.

Preferred embodiments of the present disclosure are described in detail below with reference to the drawings attached hereto. Note that the following embodiments are not to limit the matters disclosed herein and that not all the combinations of features described in the present embodiments are essential to the solutions provided by the present disclosure. Note that the same reference numeral is used to denote the same constituents to omit descriptions.

First Embodiment

First, the basic configuration of an inkjet printing apparatus according to the present embodiment is described. After that, a detailed configuration for printing an image with less bleeding and beading as described earlier will be described.

(1) Configuration of the Inkjet Printing Apparatus

Figure 2:
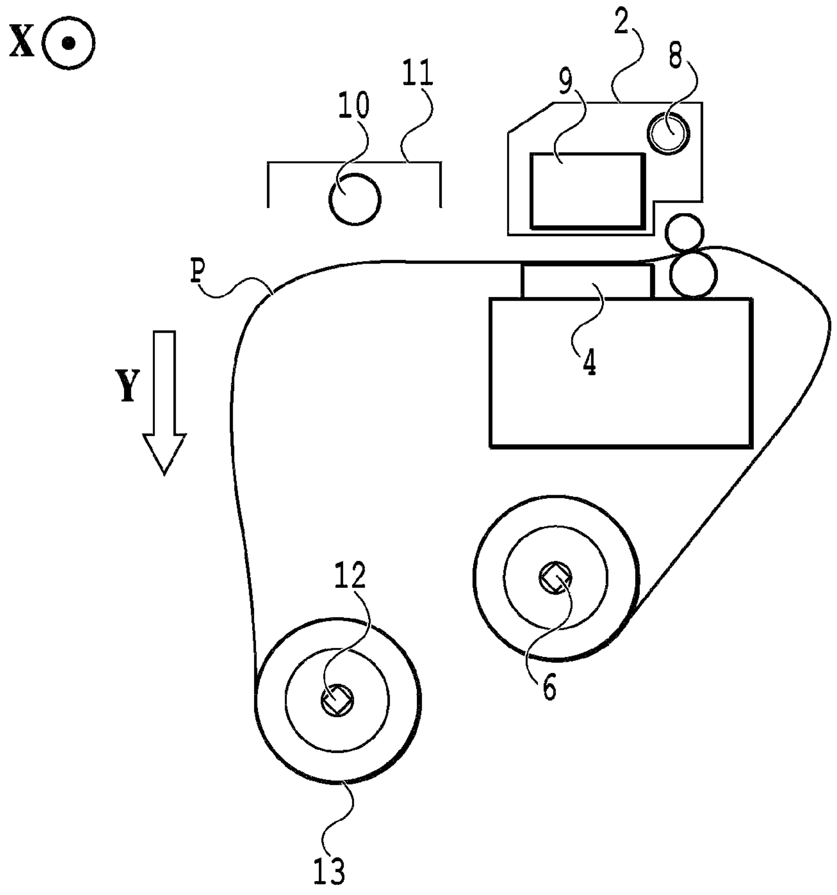
FIG. 2 is a side view of a main body of the printing apparatus.

FIG. 1 is a diagram showing an outer appearance of an inkjet printing apparatus (hereinafter also referred to as a printing apparatus or a printer) according to the present embodiment. A printing apparatus 100 in FIG. 1 is what is called a serial scanning printer and prints an image by scanning a print head in an X-direction (a scanning direction) orthogonal to a Y-direction (a conveyance direction) of a print medium P. FIG. 2 is a side view of the main body of the printing apparatus 100.

Using FIGS. 1 and 2, an overview of the configuration of the printing apparatus 100 and the operation of the printing apparatus 100 during printing is described. First, a conveyance roller driven via gears by a conveyance motor (not shown) conveys the print medium P in the Y-direction from a spool 6 holding the print medium P. Meanwhile, at a predetermined conveyance position, a carriage unit 2 is caused by a carriage motor (not shown) to scan back and forth (reciprocate) along a guide shaft 8 extending in the X-direction. Then, in the process of this scanning, at a timing based on a position signal obtained by an encoder 7, a print head 9 (to be described later) attachable to the carriage unit 2 performs an ejection operation from its ejection ports to perform printing of a band with a width corresponding to the range over which the ejection ports are arranged. In the configuration in the present embodiment, the ejection operation is performed with scans being made at a scan speed of 30 inches per second and with a printing resolution of 1200 dpi (the interval of 1/1200 inches). After that, the print medium P is conveyed, and printing for the next band width is performed.

Note that a carriage belt can be used to transmit the driving force from the carriage motor to the carriage unit 2. A driving mechanism other than the carriage belt can also be used, such as, for example, one including a lead screw and an engagement part, the lead screw extending in the X-direction and being driven and rotated by a carriage motor, the engagement part being provided at the carriage unit 2 and engaging with a groove on the lead screw.

The print medium P being fed is sandwiched and conveyed by a paper feed roller and a pinch roller and is led to a printing position on a platen 4 (a region scanned by the print head). Usually, the face surface of the print head 9 is capped in idle mode, and thus, the cap is opened before printing to make the print head 9 (the carriage unit 2) ready to scan. Then, after one scan worth of data is accumulated in a buffer, the carriage unit 2 is scanned by the carriage motor, and printing is performed as described above.

A flexible wiring substrate 19 is mounted to the print head 9 to supply, e.g., a drive pulse for ejection driving and a head temperature adjustment signal. The other end of the flexible wiring substrate 19 is connected to a controller (not shown) including a control circuit such as a CPU that executes control of the printer. A UI screen 50 is configured so that a user can input or check, e.g., information on a pause of the printing operation or information on the print medium P.

In a curing region located downstream, in the sub scanning direction Y, of a location where the print head 9 mounted to the carriage unit 2 reciprocates and scans in the main scanning direction X, a heater 10 supported by a frame (not shown) is situated. The heater 10 thermally dries an ink in liquid form on the print medium P. The heater 10 is covered with a heater cover 11. The heater cover 11 has a function to efficiently irradiate the print medium P with heat from the heater 10 and a function to protect the heater 10. After being printed by the print head 9, the print medium P is wound up by a wind-up spool 12 and forms a roll-shaped would-up medium 13. Specific examples of the heater 10 include a sheathed heater and a halogen heater. A heating temperature for a heating portion in the curing region is set considering the film formability and productivity of water-soluble resin fine particles and heat resistance of the print medium P. Note that examples of heating unit usable for the heating portion in the curing region include heating by hot air blowing from above and heating by a contact heat conductive heater from the underside of a print medium. In the example shown in the present embodiment, the heating unit for the heating portion at the curing region is provided at a single location. However, the heating unit may be provided at two or more locations and used together as long as temperatures measured by a radiation thermometer (not shown) above the print medium P do not exceed a set value for a heating temperature.

The printing apparatus 100 of the present embodiment can perform what is called multi-pass printing, in which an image is printed onto a predetermined region (a 1/n band) on the print medium P with a plurality of scans (n scans) by the print head. Details of the multi-pass printing will be described later.

(2) Configuration of the Print Head

Figure 3:
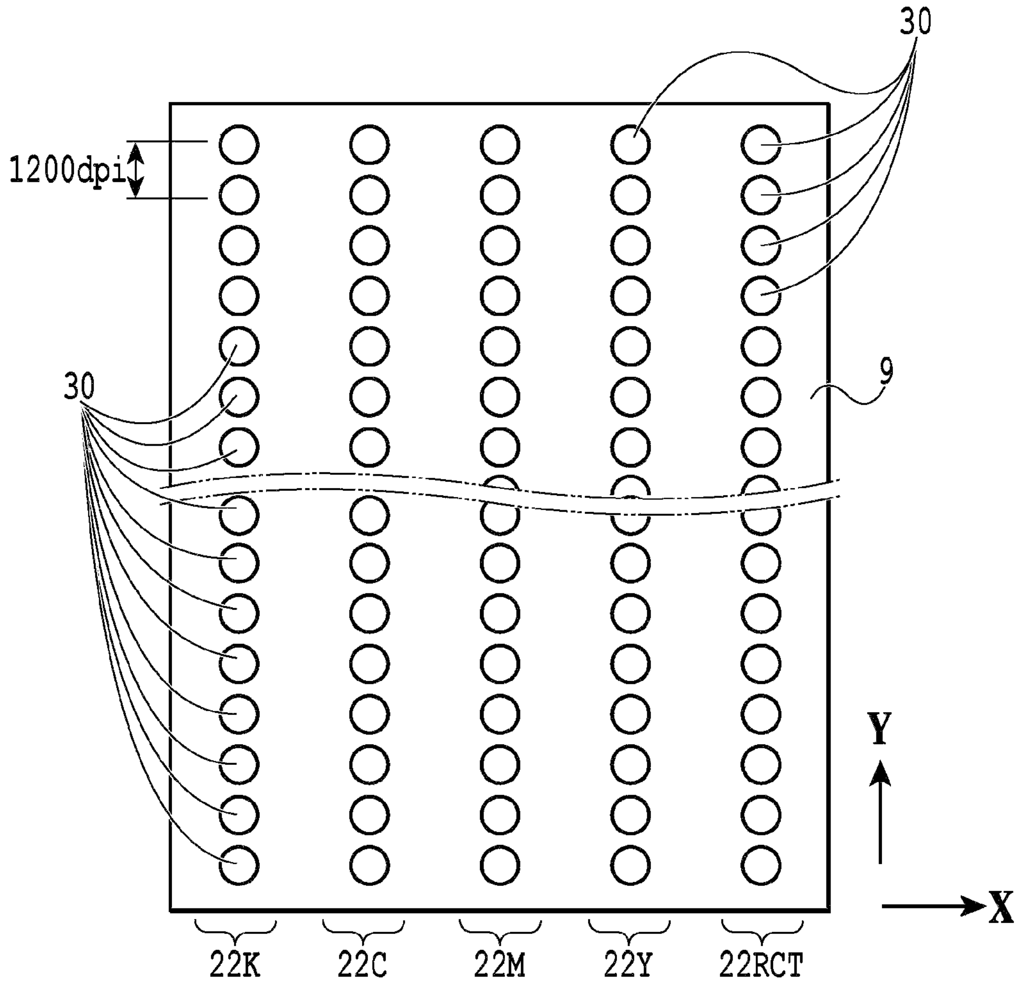
FIG. 3 is a diagram showing a print head.

FIG. 3 is a diagram showing the print head 9 according to the present embodiment. The print head 9 includes an ejection port array 22K that ejects a black ink (K) as an ink containing a color material, an ejection port array 22C that ejects a cyan ink (C), an ejection port array 22M that ejects a magenta ink (M), and an ejection port array 22Y that ejects a yellow ink (Y). Containing a color material, the black ink (K), the cyan ink (C), the magenta ink (M), and the yellow ink (Y) are also hereinafter referred to as a color material ink for the sake of brevity.

The print head 9 also includes an ejection port array 22RCT that ejects a reactive liquid ink (RCT) that does not contain a color material. This reactive liquid ink (hereinafter also referred to as a reactive liquid) contains no color material but contains a reactive component that reacts with color materials contained in the color material inks, and can reduce bleeding by coming into contact with the color material inks on the print medium.

The ejection port arrays each have ejection ports arranged in the sub scanning direction. Also, these ejection port arrays are arranged side by side on the print head 9 in the order of the ejection port arrays 22K, 22C, 22M, 22Y, and 22RCT from left to right in the main scanning direction (X-direction) intersecting with the sub scanning direction. These ejection port arrays 22K, 22C, 22M, 22Y, and 22RCT are each formed by 1280 ejection ports 30 that eject a corresponding ink and that are arranged in the Y-direction (the array direction, the sub scanning direction) at a density of 1200 dpi. Note that the amount of ink ejected from a single ejection port 30 at once is approximately 4.5 pl in the present embodiment.

The ejection port arrays 22K, 22C, 22M, 22Y, and 22RCT are each connected to an ink tank (not shown) that stores a corresponding ink and is supplied with the ink. Note that the print head 9 and the ink tanks used in the present embodiment may be configured integrally or configured to be separable from each other.

Note that detailed compositions of the black ink (K), the cyan ink (C), the magenta ink (M), the yellow ink (Y), and the reactive liquid (RCT) will be described later. Also, water-soluble resin fine particles that form a film by being heated and improve the anti-abrasion property of a printed product may be contained in each color material ink or may be contained in a clear emulsion ink (Em) which is a third ink different from the color material inks or the reactive liquid and containing no color material. In this case, the print head 9 may include an ejection port array 22Em that ejects the clear emulsion ink.

(3) Configuration of the Printing System

Figure 4:
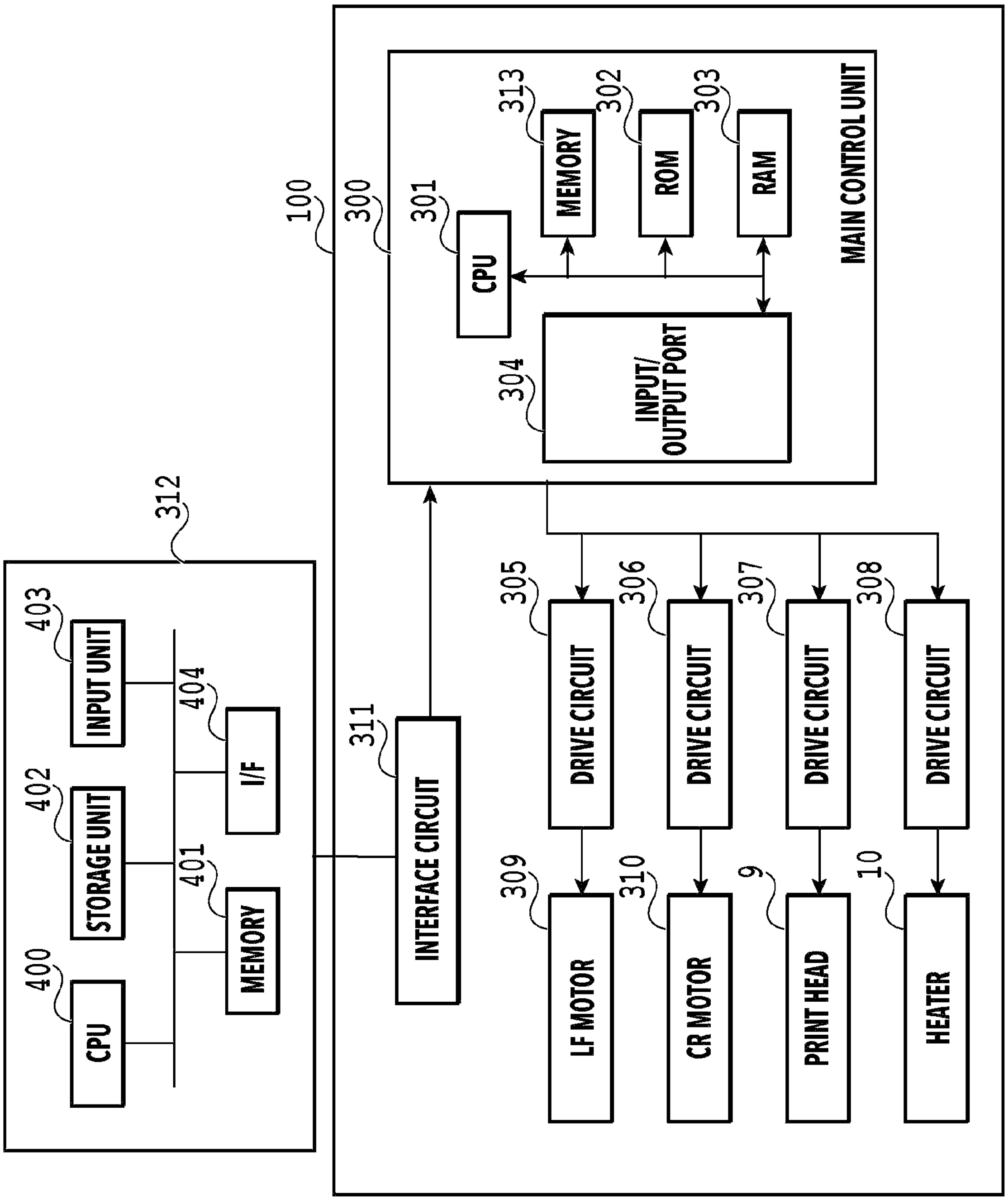
FIG. 4 is a block diagram showing a schematic configuration of a printing system including a host apparatus and a control system in the printing apparatus.

FIG. 4 is a block diagram showing a schematic configuration of a printing system including a host apparatus 312 and a control system in the printing apparatus 100 in the present embodiment. The host apparatus 312 is an information processing apparatus connected to the printing apparatus 100, such as a personal computer or a digital camera. The host apparatus 312 includes a CPU 400, a memory 401, a storage unit 402, an input unit 403 such as a keyboard or a mouse, and an interface 404 for communications with the printing apparatus 100. The CPU 400 executes various kinds of processing according to programs stored in the memory 401. These programs are supplied from an external device such as a CD-ROM to store them in the storage unit 402. The programs may be prestored in the storage unit 402.

The host apparatus 312 is connected to the printing apparatus 100 via the interface 404 and sends the printing apparatus 100 image processing information including image data expressed by R, G, and B in an image processing step to be described later and a table used in image processing after that (print control information). Based on the image processing information transmitted thereto, the printing apparatus 100 executes, e.g., color processing, image processing such as binaralizing processing, and correction processing for printing properties to be described later. Note that the host apparatus 312 may execute at least one of the color processing, the image processing, and the correction processing.

The printing apparatus 100 has a main control unit 300. The main control unit 300 includes a CPU 301 that executes printing operation and processing operation such as computation, selection, determination, and control. The main control unit 300 also includes, e.g., a ROM 302 that stores, e.g., control programs to be executed by the CPU 301, a RAM 303 used as, e.g., a buffer for print data, and an input/output port 304. In a memory 313, mask patterns to be described later and the like are stored. Connected to the input/output port 304 are drive circuits 305, 306, 307, and 308 such as actuators in a conveyance motor (LF motor) 309, a carriage motor (CR motor) 310, the print head 9, and the heater 10. The main control unit 300 is connected to the host apparatus 312 via an interface circuit 311.

(4) Print Medium

The printing apparatus of the present embodiment performs printing on a print medium with low permeability into which moisture is hard to permeate. A print medium with low permeability here is a medium that cannot absorb water whatsoever or that can absorb only a very small amount of water. Thus, with an aqueous ink containing no organic solvent, an image cannot be formed because the ink is repelled. However, a print medium with low permeability has excellent water resistance and weather resistance, and is suitable as a medium to form a print product for outdoor use. A print medium with a water contact angle of 45° or greater or preferably 60° or greater at 25° C. is typically used as a print medium with low permeability.

Some printing media with low permeability have a plastic layer formed at an outermost surface of the base material, and some printing media with low permeability do not have an ink receiving layer formed on the base material. Also, some printing media with low permeability are a sheet, film, banner, or the like of glass, YUPO, plastic, or the like. Examples of the plastic include polyvinyl chloride, polyethylene terephthalate, polycarbonate, polystyrene, polyurethane, polyethylene, and polypropylene. These printing media with low permeability have excellent resistance to water, light, and abrasion, and are therefore generally used to print a print product for outdoor display.

(5) Ink Compositions (Overview of Ink Compositions)

Details of each ink forming an ink set used in the present embodiment are described. Hereinbelow, "part" and "%" refer to a mass scale unless otherwise noted.

(5-1) Composition of Each Ink

The composition of each ink is described in detail below. The color material inks (C, M, Y, K) and the reactive liquid (RCT) used in the present embodiment all contain a water-soluble organic solvent. For the reasons of wettability and moisture retainability of the face surface of the print head 9, the water-soluble organic solvent preferably has a boiling point of between 150° C. and 300° C., inclusive. Also, from the perspectives of a function as an agent for assisting resin fine particles in its film formation and of swellability/solubility with respect to a print medium having a resin layer formed thereon, the water-soluble organic solvent is preferably formed by the following in particular: a ketone-based compound such as acetone or cyclohexanone, a propylene glycol derivative such as tetraethyleneglycol dimethyl ether, or a heterocyclic compound having a lactam structure, typified by N-methylpyrrolidone or 2-pyrrolidone. From the perspective of ejection performance, a water-soluble organic solvent content is preferably between 3 wt % and 30 wt %, inclusive. The water-soluble organic solvent can be used solely or as a mixture. Also, deionized water is desirably used as water. Note that a water-soluble organic solvent content in the reactive liquid (RCT) is not limited to any particular amount. In order to have a desired physical property value as needed, the color material inks (C, M, Y, K) may have a surfactant, an antifoam, a preservative, an antifungal, or the like added thereto as needed in addition to the above-described components.

A surfactant is used as a penetrant with an aim to improve the permeability of ink to an inkjet print medium. With more surfactant added, the property for decreasing the surface tension of ink becomes stronger, improving the wettability and permeability of the ink with respect to a print medium.

Also, pH of each ink in the present embodiment is alkali-stable, with its value ranging from 8.5 to 9.5. From the perspective of reducing elusion and deterioration of members in the printing apparatus or the print head that come into contact with each ink as well as degradation in the solubility of dispersed resin in each ink, pH of each ink is preferably between 7.0 and 10.0, inclusive. Also, the color material inks may include a white ink (W).

(5-2) Reactive Liquid

In the present embodiment, to solve problems on an image such as bleeding, a reactive liquid is employed to insolubilize part or all of a solid component of the color material ink.

With an aim to insolubilize a dissolved dye and dispersed pigment and resins, examples of the reactive liquid include a solution containing polyvalent metal ions (e.g., magnesium nitrate, magnesium chloride, aluminum sulfate, or iron chloride). As a class of flocculation effect using cations, with an aim to neutralize charges of the water-soluble resin fine particles and insolubilize anionic soluble substances, a system used by a low-molecular-weight cationic polymer flocculant can also be used.

Other examples of a reactive system include an insolubilization system using a reactive liquid utilizing a pH difference. As described earlier, most color material inks typically used in inkjet printing are alkali-stable due to properties such as the properties of the color materials, and pH is typically approximately 7 to 10. From an industrial viewpoint, and also considering, e.g., influences of external environments, pH is set to approximately 8.5 to 9.5 in many examples. To flocculate and solidify a color material ink of such a system, an acidic solution can be mixed in to change pH in order to break the stable state and flocculate dispersed components. With an aim to have such an action, a solution with acidity may be used as the reactive liquid.

(5-3) Water-Soluble Resin Fine Particles

The color material inks used in the present embodiment contain water-soluble resin fine particles. In the present embodiment, "water-soluble resin fine particles" mean polymer fine particles existing in a state of being dispersed in water. The resin fine particles may be core-shell resin fine particles each formed by a core portion and a shell portion that are different in polymer composition or may be resin fine particles obtained by performing emulsion polymerization around seed particles that are acrylic fine particles pre-synthesized to control particle size. Further, the resin fine particles may be hybrid resin fine particles obtained by chemically bonding different kinds of resin fine particles, such as acrylic resin fine particles and urethane resin fine particles.

Note that water-soluble resin fine particles do not necessarily have to be contained in the color material inks, and may be contained in a clear emulsion ink (Em) which is a third ink different from the color material inks or the reactive liquid and containing no color material.

(6) Image Processing

Figure 5:
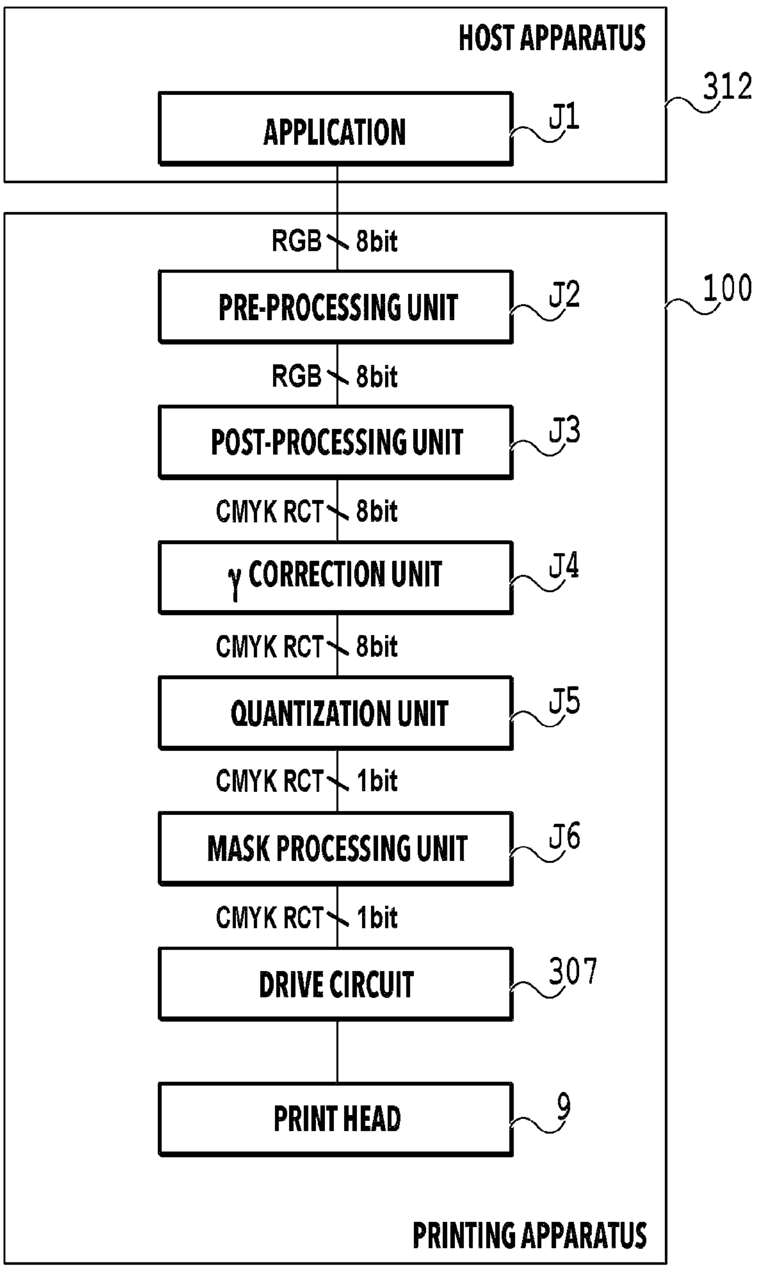
FIG. 5 is a block diagram illustrating the flow of image data conversion processing.

FIG. 5 is a block diagram illustrating the flow of image data conversion processing in the present embodiment. FIG. 5 shows the procedure of image processing in which image data inputted into the printing apparatus 100 and expressed by RGB colors each with 8 bits (256 tones) is converted into data in which each ink color is expressed by one bit and is outputted. This printing system is formed by the host apparatus 312 and the printing apparatus (printer) 100.

The host apparatus 312 is for example a personal computer (PC) and has an application J1 and a printer driver (not shown) for the printing apparatus 100 in the present embodiment. Based on information that a user specifies on a UI screen of the host apparatus 312, the application J1 executes processing for creating image data to be passed to the printer driver and processing for setting print control information used for printing control.

The image data and the print control information processed by the application J1 is passed to the printer driver before printing. The main control unit 300 of the printing apparatus performs image processing on image data transferred via the interface circuit 311 from the host apparatus 312 in which the printer driver is installed.

As a configuration for performing image processing, the main control unit 300 has a pre-processing unit J2, a post-processing unit J3, a γ correction unit J4, a quantization unit J5, and a mask processing unit J6. These units are implemented by the CPU 301 of the main control unit 300 by executing programs stored in, e.g., the ROM 302 or the memory 313. Some or all of the functions of these units may be implemented by hardware such as an ASIC or an electronic circuit. The following gives a brief description of each processing.

The pre-processing unit J2 performs color gamut mapping. In this processing, data conversion is performed to map a color gamut reproduced by sRGB-standard image data (R, G, B) to a color gamut reproduced by the printing apparatus 100. Specifically, a three-dimensional lookup table (LUT) is used to convert 256-tone data in which R, G, and B are each expressed with 8 bits, into R, G, B data (RGB values) each with 8 bits in a different color gamut.

Based on a three-dimensional LUT for the post-processing, the post-processing unit J3 converts the R, G, B data obtained by the color gamut mapping by the pre-processing unit J2 into 8-bit color separation data indicating a combination of inks to reproduce the color expressed by the data. In the present embodiment, four color inks, namely C, M, Y, and K inks, are used as the color material inks, and thus, the post-processing unit J3 converts the R, G, B data into color separation data which is a combination of these ink colors. Note that like the pre-processing unit J2, the conversion here is performed using the three-dimensional LUT and interpolation computation together. Further, the post-processing unit J3 also generates 8-bit color separation data for the reactive liquid (RCT) as the combination of inks. In other words, the post-processing unit J3 converts the R, G, B data into color separation data on C, M, Y, K, and RCT.

For each of the sets of color separation data for the respective colors obtained by the post-processing unit J3, they correction unit J4 converts the density value (tone value) of each color. Specifically, a one-dimensional LUT is used to perform the conversion so that the color separation data is linearly associated with the tone characteristics of the printing apparatus 100.

The quantization unit J5 performs quantization processing to convert the γ-corrected 8-bit color separation data on each color into 1-bit data. In the present embodiment, dithering is used to convert (binarize) the 8-bit 256-tone data into 1 bit data of "1" or "0." As a result, binary data indicating whether the printing apparatus ejects an ink can be obtained.

The mask processing unit J6, using a plurality of mask patterns having mutually complementary relations, performs conversion into printing data in which print scan timing information is added to the arrangement of dots for each color determined by the quantization unit J5. Details will be described later about this mask processing. By the mask processing, printing data for each print scan in multi-pass printing is generated for each of the colors C, M, Y, and K. Note that mask processing for the reactive liquid RCT will also be described in detail later.

The generated printing data is supplied to the drive circuit 307 at an appropriate timing in the plurality of print scans performed in multi-pass printing. Then, the printing data inputted to the drive circuit 307 is converted into a drive pulse for the print head 9, so that an ink is ejected from the ejection ports 30 of each color at a predetermined timing. In this way, ink ejection is performed according to the printing data, and an image is printed on a print medium.

Note that in the example shown in FIG. 5, the pre-processing unit J2 and the units after that are implemented by the printing apparatus 100, but some of the processing units may be executed by, e.g., the printer driver in the host apparatus 312.

(7) Multi-Pass Printing

Figure 6:
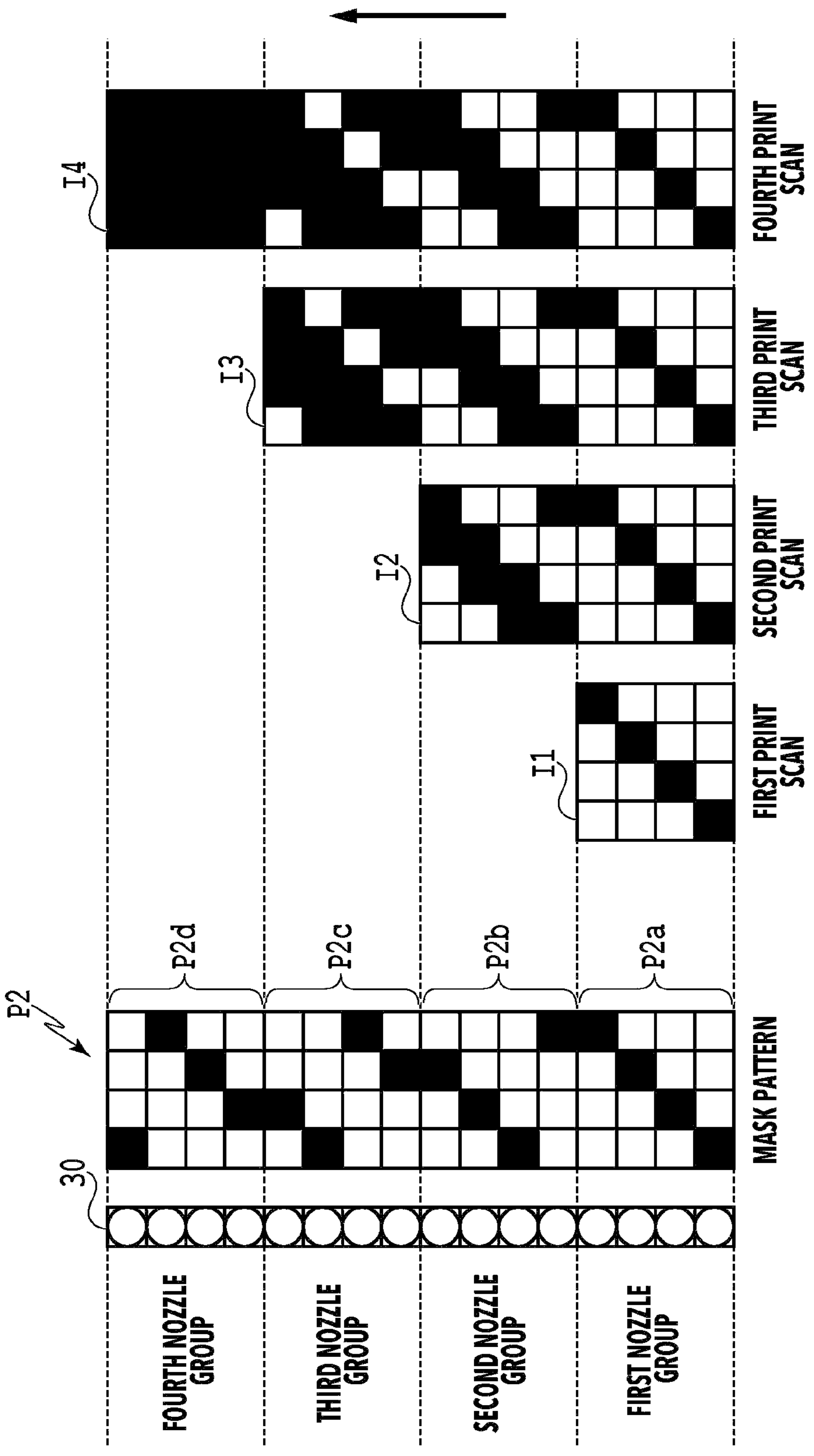
FIG. 6 is a diagram schematically showing how multi-pass printing is performed.

Next, multi-pass printing is described. Multi-pass printing is a printing method in which a predetermined printing region in a predetermined unit area (a unit region) is scanned by a print head a plurality of times to complete an image in the predetermined printing region. FIG. 6 is a diagram schematically showing how multi-pass printing is performed. Although the print head 9 employed in the present embodiment actually has 1280 ejection ports 30, FIG. 6 shows 16 ejection ports 30 to simplify the illustration, and an image is printed with four print scans.

The ejection ports 30 are divided into four nozzle groups, with the first to fourth nozzle groups each including four nozzles. In multi-pass printing, a unit region is printed by being scanned a plurality of times. Masks are used as means for dividing image data to be printed into a plurality of pieces. A mask pattern P2 is formed by mask patterns P2*a* to P2*d* that define print permitted areas for the first to fourth nozzle groups, respectively.

In a mask pattern, a black area indicates a print permitted area where printing a dot is permitted, and a white area indicates a non-print area where printing a dot is not permitted. The first to fourth mask patterns P2*a* to P2*d* have mutually complementary relations and are configured so that combining these four mask patterns completes printing of a region corresponding to 4×4 areas=16 areas. The print regions denoted by I1 to I4 show how an image is completed by a series of print scans.

Every time each print scan is complete, a print medium is conveyed intermittently in the direction indicated by the arrow in FIG. 6 by a distance corresponding to the width of a nozzle group (the width of four nozzles in FIG. 6). Thus, it is configured such that an image on a single printing region (a predetermined printing region corresponding to the width of each nozzle group) on a print medium is completed by four print scans. The mask processing unit J6 performs logical ANDs on such a mask pattern and the binary image data obtained by the above-described quantization processing, and by this processing, binary print data to be printed by each print pass is determined.

In a mask pattern, the percentage of the number of print permitted areas in each print scan is defined by a printing percentage (%). Specifically, a printing percentage for each print scan is expressed by the percentage of the number of permitted areas in the print scan with the above-described region corresponding to 16 areas being set as 100%. For example, the mask patterns P2*a* to P2*d* are mask patterns each having an equally distributed number of print permitted areas in its print scan, and therefore the printing percentage for each print scan is all 25%. In a case of using this mask pattern to print an image pattern having dots in all the 16 areas described above, the amount of ink applied by each print scan is four dots.

The basic configuration of the printing apparatus 100 of the present embodiment has thus been described. The following describes a detailed configuration for printing an image with less bleeding and beading.

<Selecting a Mask Pattern According to the Ejection Amount (Application Amount) of Reactive Liquid Based on Image Data>

(Print Medium)

In the present embodiment, a print medium with low permeability is used as a print medium as described earlier. Specifically, a print medium with low permeability used in the present embodiment is Scotchcal Graphic Film (IJ1220N), which is an adhesive PVC film manufactured by 3M Japan Limited.

(Selecting a Mask Pattern)

In the present embodiment, an example is described of how an image is printed with less bleeding and beading, by appropriately selecting a pattern to be used in mask processing for the reactive liquid (RCT) performed by the mask processing unit J6. In the present embodiment, the amount of the reactive liquid to be applied to a predetermined region is determined based on image data (R, G, B data) to be printed in the predetermined region. The mask pattern to be used in the mask processing for the reactive liquid (RCT) performed by the mask processing unit J6 is appropriately selected according to this amount of the reactive liquid. Then, the selected mask pattern is applied to RCT data corresponding to the predetermined region and quantized by the quantization unit J5, so that an image is printed with less bleeding and beading. For example, in a case of image data such that image data on a first predetermined region and image data on a second predetermined region are different in their contents (their R, G, B data differ from each other by a predetermined value or above), mask patterns to apply to them are also different. Details are described below.

Figure 7:
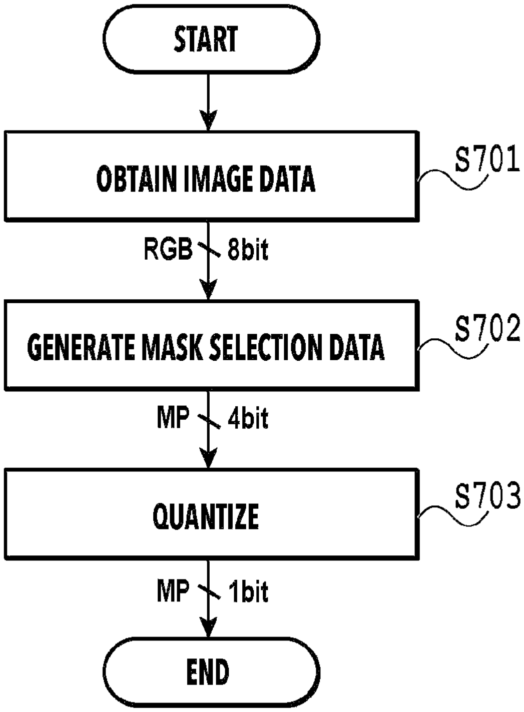
FIG. 7 is a flowchart showing the flow of processing for selecting a mask pattern for a reactive liquid.

FIG. 7 is a flowchart showing the flow of processing for selecting a mask pattern for the reactive liquid for a predetermined region according to the ejection amount (application amount) of the reactive liquid based on image data on the predetermined region. The processing in FIG. 7 is performed by the main control unit 300. Specifically, the processing in FIG. 7 is implemented by the CPU 301 of the main control unit 300 by executing programs stored in, e.g., the ROM 302 or the memory 313. Some or all of the functions in the steps in FIG. 7 may be implemented by hardware such as an ASIC or an electronic circuit. Note that the letter "S" in the description of the processing means that it is a step in the flowchart (this applies to the other processing herein).

In S701, the main control unit 300 obtains image data. Here, the main control unit 300 obtains 8-bit R, G, B data obtained by the pre-processing performed by the pre-processing unit J2. In S702, based on the image data obtained in S701, the main control unit 300 generates data for selecting a mask to be used by the mask processing unit J6 for data on the reactive liquid (RCT) (hereinafter referred to as mask selection data). Specifically, in S702, the main control unit 300 converts the obtained R, G, B data into 4-bit mask selection data MP based on a three-dimensional LUT for mask selection. As will be described in detail later about the mask selection data MP, the larger the value of the mask selection data MP, the more the reactive liquid is applied. The three-dimensional LUT for mask selection is an LUT such that, for example, the higher a RGB value, the higher the value of the mask selection data MP converted (generated). In other words, because a larger amount of color material ink is used for a larger RGB value, the mask selection data MP is generated so that the amount of the reactive liquid may be larger accordingly. Note that there are not necessarily linear relations, and the LUT is referred to as needed to generate the mask selection data MP. The mask selection data MP is generated for each predetermined region to which a mask is applied. Thus, in S702, the image data obtained in S701 is converted into the mask selection data MP on each predetermined region. Note that the mask selection data MP being 4 bits is just an example, and the R, G, B data may be converted into any number of bits. Also, the mask selection data may be generated based not only on the R, G, B data after the pre-processing, but also on the RCT data obtained by the post-processing performed by the post-processing unit J3 or by the γ correction performed by the γ correction unit J4.

In S703, the main control unit 300 performs quantization processing by converting each set of 4-bit mask selection data MP into 1-bit data. In the present embodiment, dithering is used to convert (binarize) the 4-bit data into 1-bit data of "1" or "0." The mask processing unit J6 will perform mask processing for the reactive liquid RCT using a mask pattern corresponding to the mask selection data MP of "1" or "0" generated here. The following describes, using FIGS. 8 to 10C, a mask pattern applied in accordance with the mask selection data MP obtained in S703.

Figure 8:
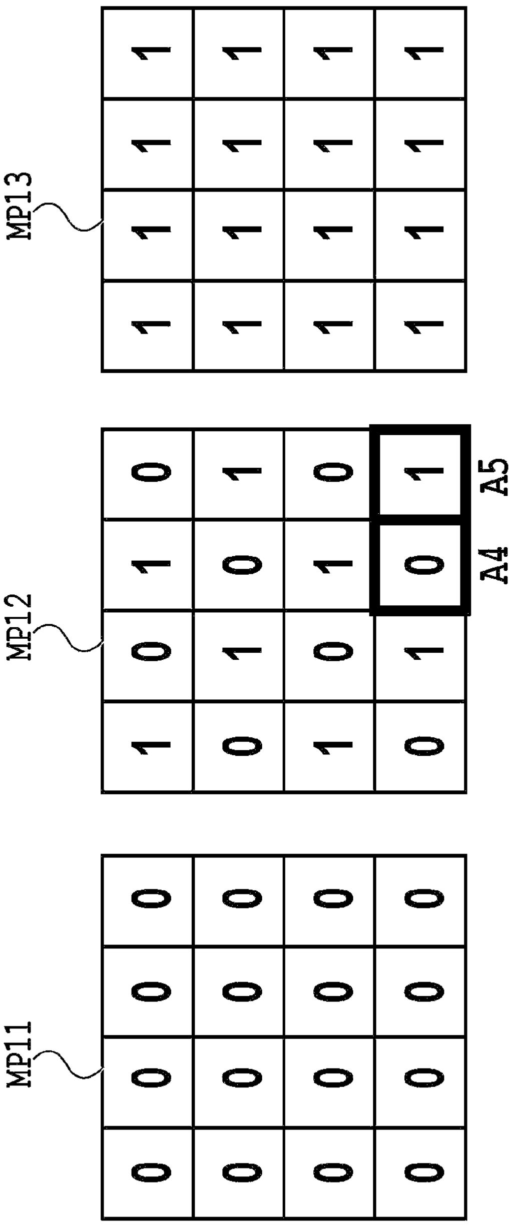
FIG. 8 is a diagram showing examples of mask selection data.

FIG. 8 shows three representative examples of the binary mask selection data MP generated in S703 for 4×4=16 areas and based on the application amount of the reactive liquid. As described earlier, the mask selection data MP is different depending on corresponding image data. FIG. 8 shows three examples for the sake of illustration. Mask selection data MP11 in FIG. 8 is an example of the mask selection data MP for a case where an application amount of the reactive liquid is relatively small (or zero here). In the mask selection data MP11, the value of the mask selection data MP is "0" in all the 16 areas. Mask selection data MP13 is an example of the mask selection data for a case where an application amount of the reactive liquid is relatively large (the reactive liquid is applied to the entire predetermined region here). In the mask selection data MP13, the value of the mask selection data MP is "1" in all the 16 areas. Mask selection data MP12 is an example of the mask selection data for a case where an application amount of the reactive liquid is relatively intermediate. In the mask selection data MP12, the value of mask selection data MP is "0" in eight areas and "1" in eight areas.

Figure 9B:
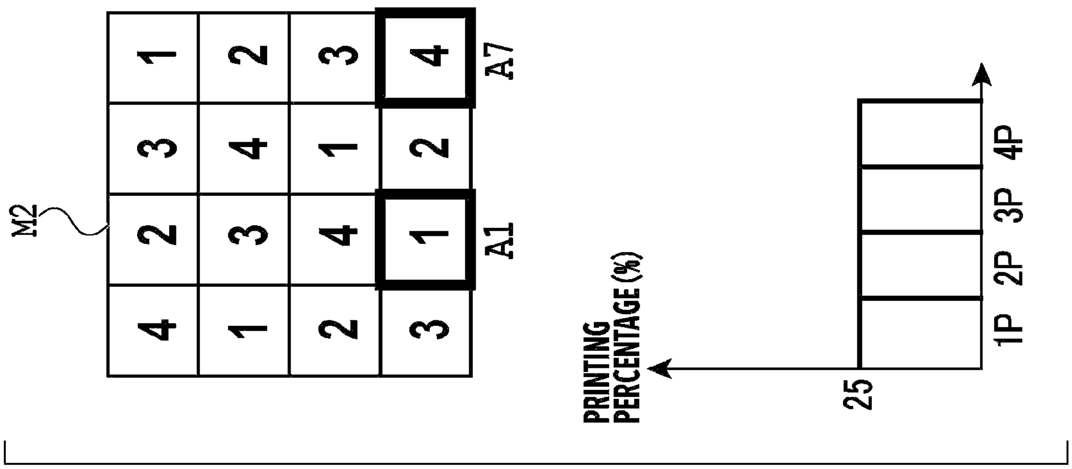
FIGS. 9A and 9B are diagrams each showing a printing mask and a printing percentage for a reactive liquid.
Figure 9A:
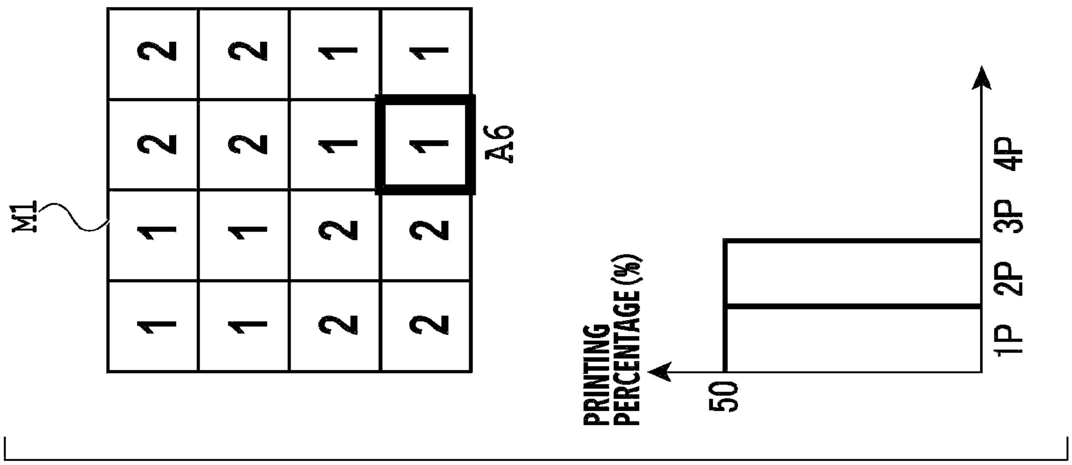

FIGS. 9A and 9B are diagrams each showing a reactive liquid printing mask for 4×4=16 areas and a printing percentage defined by the printing mask. FIG. 9A is a prior-ejection printing mask (also referred to a first mask) selected for an area where the value of the mask selection data MP is "0," or in other words, is a printing mask selected for an area, in the 16 areas, where the value of the mask selection data MP is "0." For example, because the mask selection data MP11 in FIG. 8 has "0" for all the areas, the same mask pattern as the first mask M1 in FIG. 9A is selected as a result. Meanwhile, FIG. 9B is a regular printing mask (also referred to a second mask) selected for an area where the value of the mask selection data MP is "1." The first mask M1 and the second mask M2 are masks prestored in the ROM 302 or the like.

The numerical value in each area of the first mask M1 and the second mask M2 indicates the ordinal number of the scan by which the area is printed. For example, "1" in area A1 in FIG. 9B indicates that the area is printed by the first scan. Similarly, "2" indicates an area printed by the second scan, "3" indicates an area printed by the third scan, and "4" indicates an area printed by the fourth scan. Thus, the first mask M1 and the second mask M2 shown in FIGS. 9A and 9B are each formed by four mask patterns like the mask shown in FIG. 6 is (P2*a* to P2*d* in FIG. 6), but FIGS. 9A and 9B show those four mask patterns as one mask collectively.

The regular printing mask (second mask) M2 has four print permitted areas for each of the first to fourth print scans (a printing percentage of 25%). By contrast, the prior ejection printing mask (first mask) M1 has eight print permitted areas for each of the first and second print scans (a printing percentage of 50%) and zero print permitted areas for each of the third and fourth print scans. Thus, the prior ejection printing mask M1 is a mask for completing application of the reactive liquid with the first two scans.

Compared to a case of using the regular printing mask M2, using the prior ejection printing mask M1 provides a relatively high probability of the reactive liquid being printed by an earlier scan than a color material ink. Thus, the prior ejection printing mask M1 is a mask that efficiently reduces bleeding between color material inks. However, in the case of using the prior ejection printing mask M1, the printing percentage of the first and second scans is higher than in the case of using the regular printing mask M2. In other words, in a case where the reactive liquid is applied in an amount exceeding a predetermined amount, beading is more likely to occur due to a contact between droplets of the reactive liquid. For this reason, the prior ejection printing mask M1 is used for an area where the reactive liquid application amount is relatively small (i.e., the mask selection data MP is "0"). By contrast, the regular printing mask M2 is used for an area where the reactive liquid application amount is relatively large (i.e., the mask selection data MP is "1"). In the mask selection data MP defined for 16 areas, an area with "0" is assigned a value in the prior ejection printing mask M1 at a position corresponding to the area. Also, an area with "1" is assigned a value in the regular printing mask M2 at a position corresponding to the area. A mask pattern thus assigned values corresponding to all the areas is selected. By thus selecting a mask pattern to be used in mask processing, it is possible to reduce both bleeding between color material inks and beading of droplets of the reactive liquid. Note that a mask pattern selected according to the values of the areas in the mask selection data MP and applied may be a pattern selected from ones stored in the ROM 302 or the like or a pattern generated from the prior ejection printing mask M1 and the regular printing mask M2 appropriately.

Figure 10C:
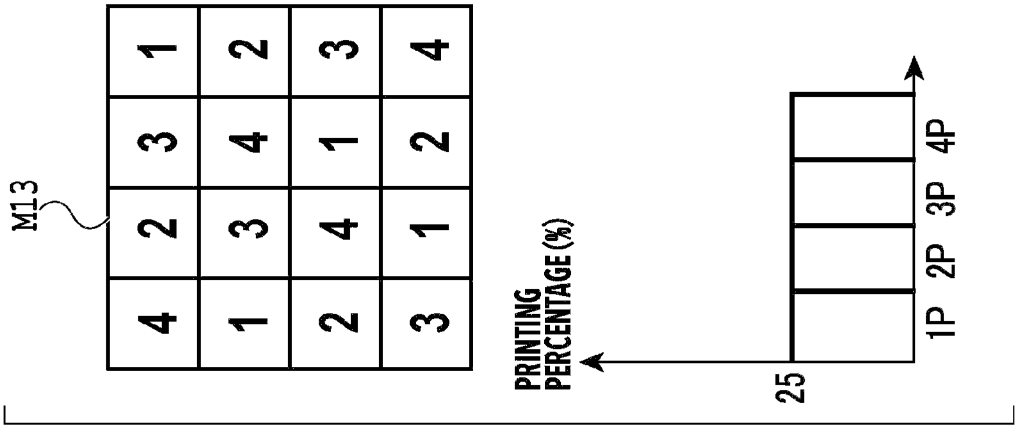
FIGS. 10A to 10C are diagrams each showing a mask pattern and a printing percentage for a reactive liquid.
Figure 10B:
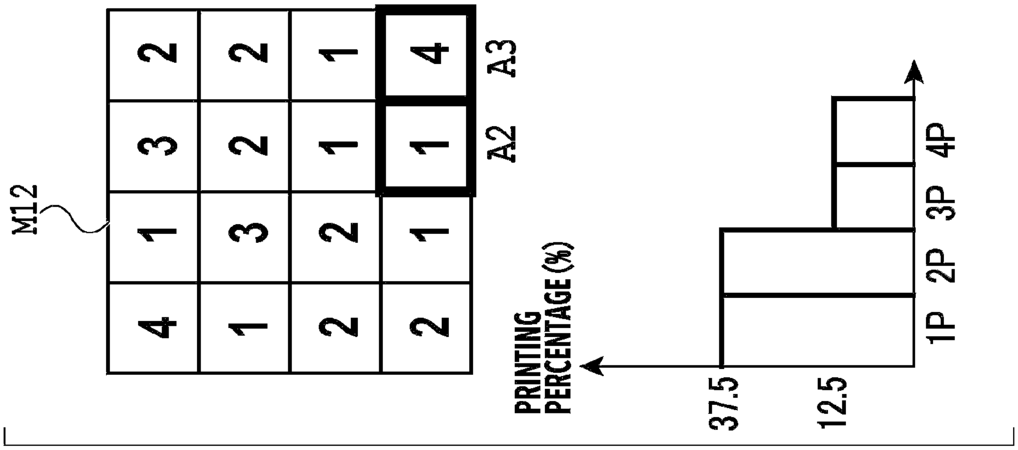
Figure 10A:
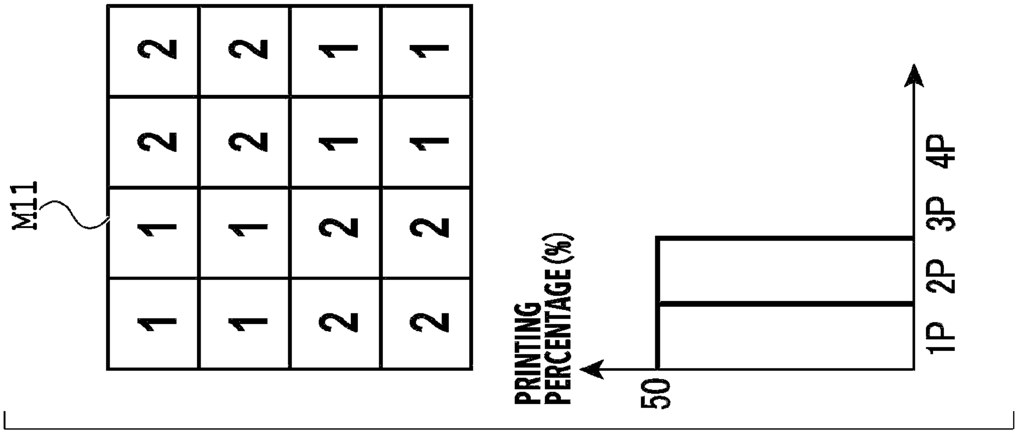

FIGS. 10A to 10C are diagrams each showing a mask pattern for 4×4=16 areas which is selected according to each reactive liquid application amount and a printing percentage defined by the mask pattern. A mask pattern M11 shown in FIG. 10A is a mask pattern selected based on the mask selection data MP11 (FIG. 8) for a case where the reactive liquid application amount is relatively small. Because the mask selection data MP11 has "0" as the values of the mask selection data MP for all the 16 areas, the prior ejection printing mask M1 is selected for all the areas in the mask pattern M11. As a result, the mask pattern M11 is substantially the same mask pattern as the prior ejection printing mask M1. A mask pattern M13 shown in FIG. 10C is a mask pattern selected based on the mask selection data MP13 (FIG. 8) for a case where the reactive liquid application amount is relatively large. Because the mask selection data MP13 has "1" as all the values of the mask selection data MP, the regular printing mask M2 is selected for all the areas in the mask pattern M13. As a result, the mask pattern M13 is substantially the same mask pattern as the regular printing mask M2.

A mask pattern M12 shown in FIG. 10B is a mask pattern selected based on the mask selection data MP12 (FIG. 8) for a case where the reactive liquid application amount is intermediate. In the mask selection data MP12, the value of the mask selection data MP is "0" in eight areas and "1" in eight areas. Thus, for the mask pattern M12, the prior ejection printing mask M1 and the regular printing mask M2 are selected exactly fifty-fifty. The mask pattern M12 is described in detail. First, an example where the target area is A2 is described. Because the value in the area A4 in the mask selection data MP12 is "0," the prior ejection printing mask M1 is selected as a mask selected for the area A2. Thus, the value "1" in an area A6 in the prior ejection printing mask M1 corresponding to the area A2 is the value for the area A2 in the mask pattern M12. Next, a case where the target area is A3 is described. Because the value in an area A5 in the mask selection data MP12 is "1," the regular printing mask M2 is selected as a mask selected for the area A3 which is next to the area A2. Thus, the value "4" in an area A7 in the regular printing mask M2 corresponding to the area A5 is the value for the area A3 in the mask pattern M12. This is done for all of the 16 areas to obtain the mask pattern M12 shown in FIG. 10B.

The mask pattern M12 has six print permitted areas for each of the first and second print scans (a printing percentage of 37.5%) and two print permitted areas for each of the third and fourth print scans (a printing percentage of 12.5%). In this way, a mask pattern to be used in mask processing for the reactive liquid in the present embodiment is appropriately selected according to the reactive liquid application amounts based on image data. For example, by using the prior ejection printing mask M1 in a case where the reactive liquid application amount is small, bleeding between color material inks can be efficiently reduced. Meanwhile, by using the regular printing mask M2 in a case where the reactive liquid application amount is large, beading caused by a contact between droplets of the reactive liquid can be efficiently reduced. Further, for a reactive liquid application amount in between, a duty in between that of the prior ejection printing mask M1 and that of the regular printing mask M2 is employed so that bleeding between color material inks and beading between droplets of the reactive liquid can both be reduced properly.

As thus described, in a case where an image is printed with four print scans and where the reactive liquid is applied in a relatively large amount, the total application amount of the reactive liquid printed by the first two print scans and the total application amount of the reactive liquid printed by the second two print scans are substantially equal to each other. In other words, the total application amount of the reactive liquid printed by the first print scan and the second print scan and the total application amount of the reactive liquid printed by the third and the fourth print scans are substantially equal to each other. By contrast, in a case where the reactive liquid is applied in a relatively small amount, the total application amount of the reactive liquid printed by the first two print scans is larger than the total application amount of the reactive liquid printed by the second two print scans. Performing such printing control allows an image to be printed with less bleeding and beading and consequently with high print quality.

Note that the example described above only describes what kind of mask pattern is used in the mask processing. Whether the reactive liquid is actually applied is, as described earlier, determined by the processing (mask processing) in which logical ANDs are performed on this mask pattern and the RCT data on the reactive liquid based on the image data. Thus, even in a case where, for example, the regular printing mask M2 is used, if the image data to be printed is unbalanced, the application amount of the reactive liquid to be printed is not equal between the first two scans and the second two scans. For example, in a case where only an area printed by the first scan in FIG. 9B has printing data, the application amount of the reactive liquid printed is not equal between the first two scans and the second two scans. However, it is possible to reduce the imbalance in image data with a combination of quantization processing and a mask pattern. Thus, a small degree of imbalance (desirably 10% or less) in the printing percentage is not problematic and can be said to be substantially equal.

Although multi-pass printing has four passes in the example described in the present embodiment, the present disclosure is not limited to four passes, and the advantageous effects provided by the present embodiment can be achieved irrespective of the number of passes. Also, although described as having complementary relations above, a plurality of print passes in multi-pass printing do not necessarily have to have complementary relations, and dots may be thinned out or increased.

For example, in a case of five-pass printing, the total application amount of the reactive liquid printed by the first 2.5 scans and the total application amount of the reactive liquid printed by the second 2.5 scans may be changed according to the application amount of the reactive liquid. Specifically, the sum of the application amount of the reactive liquid printed by the first print scan, the application amount of the reactive liquid printed by the second print scan, and a half of the application amount of the reactive liquid printed by the third print scan corresponds to the total amount of the reactive liquid by the first half scans in the example described above. Also, the sum of a half of the application amount of the reactive liquid printed by the third print scan, the application amount of the reactive liquid printed by the fourth print scan, and the application amount of the reactive liquid printed by the fifth print scan corresponds to the total application amount of the reactive liquid by the second half scans. Then, as described in the example of four-pass printing, a mask pattern controlling the application amount for the first half of the print scans and the application amount for the second half of the print scans may be appropriately selected depending on the application amount based on the image data.

In other words, in the present embodiment, the following control is performed by the printing apparatus 100 that prints an image on a unit area by scanning the print head 9 N times (where N is an integer of 2 or greater) in the main scanning direction. Considered here are a case where the application amount of the reactive liquid per unit area is a first amount and a case where the amount of the reactive liquid per unit area is a second amount larger than the first amount. Then, the total application amount of the reactive liquid printed by the first N/2 scans of the N scans and the total application amount of the reactive liquid printed by the second N/2 scans are made to be different between the case where the application amount of the reactive liquid per unit area is the first amount and the case where the application amount of the reactive liquid per unit area is the second amount. Specifically, in the case where the application amount of the reactive liquid per unit area is the first amount, a mask pattern applied is such that the total application amount of the reactive liquid printed by the first N/2 scans is larger than the total application amount of the reactive liquid printed by the second N/2 scans. By contrast, in the case where the application amount of the reactive liquid per unit area is the second amount, a mask pattern applied is such that the total application amount of the reactive liquid printed by the first N/2 scans is substantially equal to the total application amount of the reactive liquid printed by the second N/2 scans.

Also, print scans in the present embodiment may be unidirectional print scans in the +X-direction shown in FIG. 3 or bidirectional print scans in the ±X-directions. Because the present embodiment assumes that the reactive liquid is applied to a print medium before the color material inks, in the case of bidirectional printing scanning, the first print scan is preferably a print scan in the +X-direction.

As described above, the present embodiment allows an image to be printed with less bleeding and beading by performing printing control according to the application amount of the reactive liquid. Specifically, a mask pattern to be applied in the reactive liquid mask processing is appropriately determined according to the application amount of the reactive liquid based on image data. Then, the reactive liquid mask processing is performed using the mask pattern thus determined, and consequently an image can be printed with less bleeding and beading.

Second Embodiment

The present embodiment is based on the example described in the first embodiment and describes an example of changing a mask to use depending on the absorbency of the print medium. Specifically, the regular printing mask M2 is the same as the example described in the first embodiment, but for the prior printing mask, a different mask is used depending on the absorbency of the print medium.

(Print Medium)

In the present embodiment, a print medium with low permeability as described in the first embodiment and inkjet printing plain paper are used and described as examples of the print medium. As the print medium with low permeability, Scotchcal Graphic Film (IJ1220N), which is an adhesive PVC film manufactured by 3M Japan Limited, is used. As the inkjet printing plain paper, Standard Plain Paper 2 (LFM-PPS2) manufactured by Canon Inc. is used.

With a print medium with good absorbency, such as inkjet printing paper or a cloth/fabric material, prior application of the reactive liquid may not efficiently provide the bleeding reducing effect. This is because a reactive component which is applied to the surface of a print medium and which is to flocculate with a color material sinks into the print medium with time. Thus, in a case of a print medium with high absorbency, a gentle prior ejection printing mask to be described later is preferably used, compared to a print medium with low permeability.

(Selecting a Mask Pattern)

Figure 11:
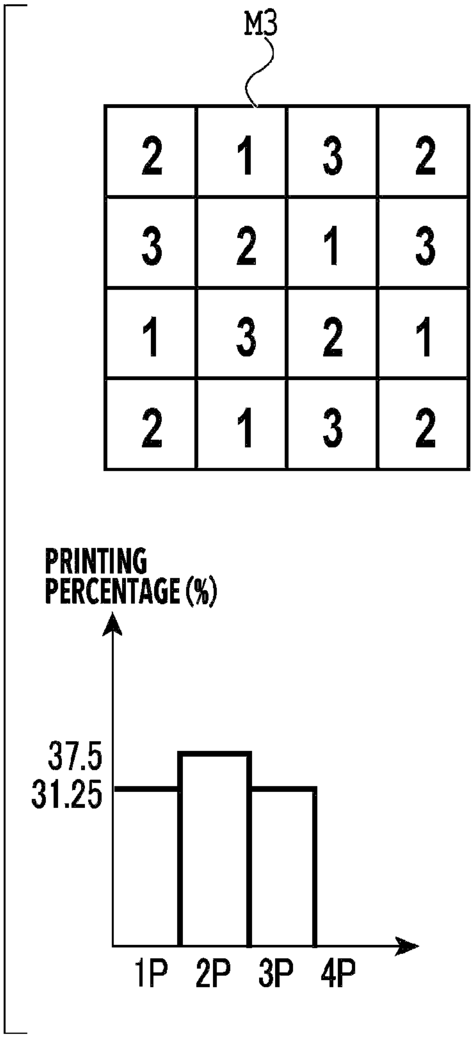
FIG. 11 is a diagram showing a gentle prior printing mask and a printing percentage.

FIG. 11 shows a gentle prior ejection printing mask for a reactive liquid (also referred to as a third mask) and a printing percentage defined by the mask. The gentle prior ejection printing mask M3 has five print permitted areas for the first print scan, six print permitted areas for the second print scan, five print permitted areas for the third print scan, and zero print permitted areas for the fourth print scan. Thus, having lower (reduced) printing percentages for the first print scan and the second print scan than the prior ejection printing mask M1 described in the first embodiment, the gentle prior ejection printing mask M3 is a gentler prior ejection printing mask. In the present embodiment, in a case of using inkjet printing plain paper as a print medium, the gentle prior ejection printing mask M3 (the third mask) is used instead of the prior ejection printing mask M1 (the first mask) described in the first embodiment. Other part of processing is similar to the processing described in the first embodiment.

Which of the prior ejection printing mask M1 and the gentle prior ejection printing mask M3 to use is determined by the main control unit 300 that obtains information on the print medium used. The information on the print medium used may be specified by a user with the application J1 or may be specified by a user on the UI screen 50 of the printing apparatus 100. Also, the information on a print medium used may be automatically obtained by the main control unit 300 using a print medium determination sensor mounted in the printing apparatus 100.

As described above, in the present embodiment, in a case of using a print medium with good absorbency, out of the four scans for printing an image, the total application amount of the reactive liquid printed by the first two scans is reduced compared to a case of using a print medium with low permeability. Such control allows an image to be printed with less bleeding and beading even in a case where the type of print medium is different.

Third Embodiment

In the present embodiment, an example is described where the print head has a plurality of nozzle arrays for the reactive liquid. In a case where there are a plurality of reactive liquid nozzle arrays, applying a different mask pattern to each of the nozzle arrays allows the advantageous effects similar to those in the example described in the first embodiment to be provided.

(Print Medium)

In the present embodiment, Scotchcal Graphic Film (IJ1220N), which is an adhesive PVC film manufactured by 3M Japan Limited, is used as the print medium with low permeability, like in the example described in the first embodiment.

(Selecting a Mask Pattern)

Figure 12:
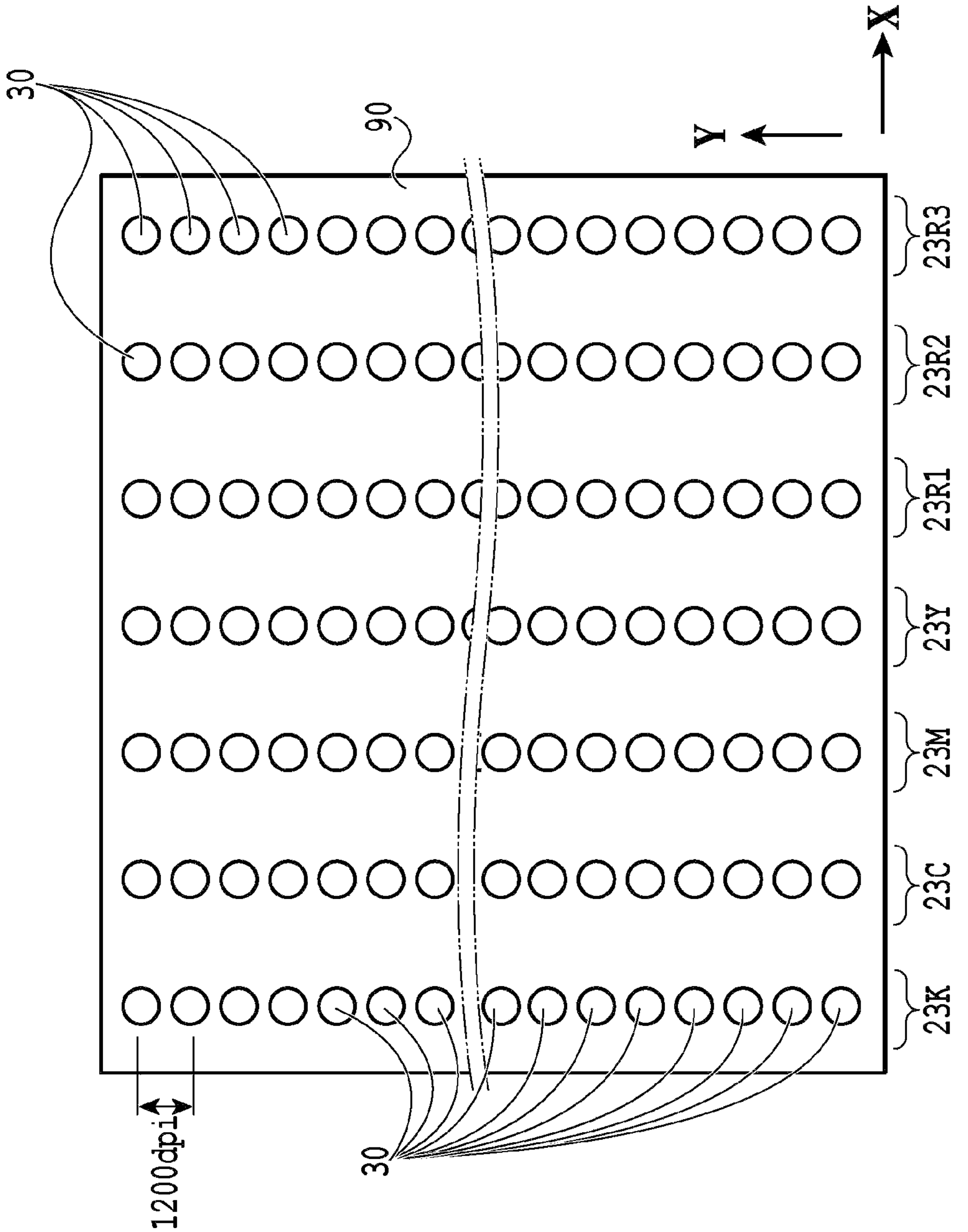
FIG. 12 is a diagram showing an example of a print head.

FIG. 12 is a diagram showing an example of a print head 90 used in the present embodiment instead of the print head 9 described in the first embodiment. The print head 90 has three nozzle arrays that eject the reactive liquid (RCT), which are called RCT1, RCT2, and RCT3 (hereinafter denoted as R1, R2, and R3) for distinction. The nozzle arrays are arranged in the following order from the left to the right in the X-direction: 23K, 23C, 23M, 23Y, 23R1, 23R2, and 23R3. These nozzle arrays are each configured by 1280 ejection ports 30 that eject a corresponding ink and that are arranged in the Y-direction (the arrangement direction) at a density of 1200 dpi.

In the present embodiment, the post-processing unit J3 also generates color separation data for the reactive liquid nozzle arrays R1, R2, and R3. In other words, sets of color separation data to be allocated to the respective reactive liquid nozzle arrays are generated. Then, the ink application amounts for the respective reactive liquid nozzle arrays R1, R2, and R3 are determined based on the data generated by the post-processing unit J3.

FIGS. 13A to 13C are diagrams each illustrating how mask patterns are allocated to the nozzle arrays and the application amounts of ink per unit area. FIG. 13A is a diagram for a case where the reactive liquid is applied in a relatively small amount (the reactive liquid application amount is 2% in total). FIG. 13B is a diagram for a case where the reactive liquid is applied in an amount larger than FIG. 13A (the reactive liquid application amount is 20% in total). FIG. 13C is a diagram for a case where the reactive liquid is applied in an amount larger than FIG. 13B (the reactive liquid application amount is 40% in total).

A mask pattern is allocated to each of the reactive liquid nozzle arrays. FIGS. 13A to 13C show an example where the prior ejection printing mask M1 is applied to the reactive liquid nozzle array R1 and the regular printing mask M2 is applied to the nozzle arrays R2 and R3. In FIG. 13A, the whole reactive liquid application amount, i.e., 2%, is applied using the nozzle array R1, i.e., the prior ejection printing mask M1. By thus ejecting the reactive liquid so that the reactive liquid may be toward a prior ejecting relation relative to the color material inks, bleeding between color material inks can be efficiently reduced.

Meanwhile, in a case of FIG. 13C, control is performed so that out of the total reactive liquid application amount, i.e., 40%, 20% is applied by each of the nozzle arrays R2 and R3. In other words, the whole reactive liquid application amount is applied using the regular printing mask M2. Thus, beading between droplets of the reactive liquid can be reduced.

Further, in a case of FIG. 13B, control is performed so that out of the total reactive liquid application amount, i.e., 20%, 10% is applied by the nozzle array R1 and the remaining 5% each is applied by the nozzle arrays R2 and R3. In this way, bleeding between color material inks and beading between droplets of the reactive liquid can both be reduced appropriately.

As thus described, in a case where the reactive liquid application amount is relatively small, control is performed so that the application amount of the reactive liquid printed by the nozzle array R1 may be larger than the total application amount of the reactive liquid printed by the nozzle arrays R2 and R3. In a case where the reactive liquid application amount is relatively large, control is performed so that the total application amount of the reactive liquid printed by the nozzle arrays R2 and R3 may be larger than the application amount of the reactive liquid printed by the nozzle array R1. Also, in a case of printing an image with four print scans, a mask pattern applied to the nozzle array R1 is configured so that the total application amount of the reactive liquid printed by the first two scans may be larger than the total application amount of the reactive liquid printed by the second two scans. Meanwhile, a mask pattern applied to the nozzle arrays R2 and R3 is configured so that the total application amount of the reactive liquid printed by the first two scans may be substantially equal to the total application amount of the reactive liquid printed by the second two scans. This printing control allows an image to be printed with less bleeding and beading even in a case where a plurality of nozzle arrays are provided to eject the reactive liquid.

Although there are three nozzle arrays that apply the reactive liquid in the example described in the present embodiment, the same control can be performed in a case where there are a plurality of arrays other than three. For example, there may be two nozzle arrays. In this case, the prior ejection printing mask may be applied to one of the nozzle arrays, and the regular printing mask may be applied to the other one of the nozzle arrays.

Also, like the example described in the first embodiment, the present embodiment may also perform unidirectional printing or bidirectional printing. Also, although the prior ejection printing mask M1 is applied to the nozzle array R1 and the regular printing mask M2 is applied to the nozzle arrays R2 and R3 in the examples shown in FIGS. 13A to 13C, the present disclosure is not limited to these examples. Masks to apply may be changed appropriately, such as, for example, applying the prior ejection printing mask M1 to the nozzle array R3 and applying the regular printing mask M2 to the nozzle arrays R1 and R2.

Fourth Embodiment

The present embodiment describes an example of obtaining advantageous effects similar to those obtained by the first embodiment by using a mask pattern suited to data obtained by quantization processing. In the examples described in the embodiments above, a mask pattern is applied selectively from a plurality of masks. For example, in the example described in the first embodiment, a mask pattern is applied selectively from two kinds of masks: the prior ejection printing mask and the regular printing mask. The present embodiment describes an example of using one kind of mask pattern suited to data obtained by quantization processing. An image can be printed with less bleeding and beading in this case as well. The present embodiment uses quantization processing that forms dots periodically on a unit region like dithering or the like.

With a high printing duty (tone value) in image data, a border in an image between regions having undergone different numbers of print scans (i.e., a region printed by a nozzle at an end portion of a nozzle array) produces a streak because of an ink flowing in due to the difference in the ink amount. Also, a streak due to misalignment in sheet conveyance also occurs. This can occur similarly with a reactive liquid as well. Thus, the streak can be reduced by reducing the number of dots printed by nozzles at the end portions compared to ones at the center portion. The present embodiment can change the printing percentage (ejection percentage) of each nozzle in a nozzle array according to the printing duty of the reactive liquid and thus can reduce streaks.

(Print Medium)

In the present embodiment, Scotchcal Graphic Film (IJ1220N), which is an adhesive PVC film manufactured by 3M Japan Limited, is used as the print medium with low permeability, like in the example described in the first embodiment.

(Multi-Pass Printing)

Figure 14:
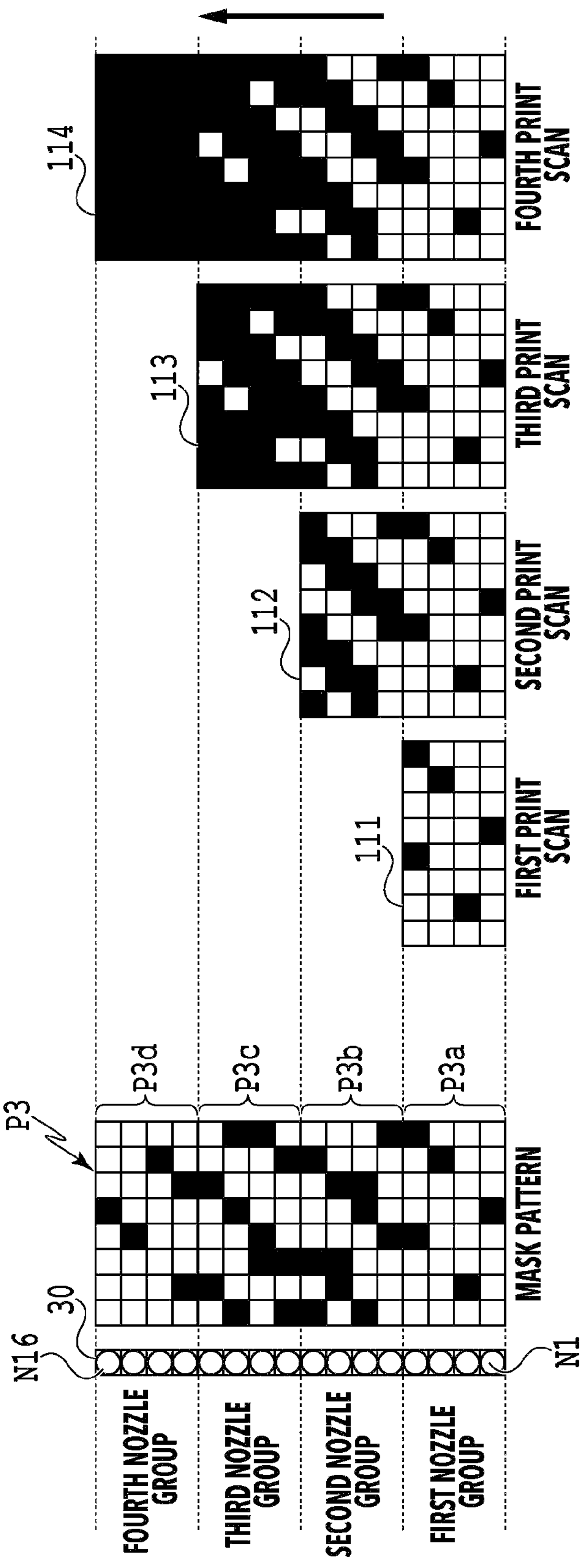
FIG. 14 is a diagram schematically showing how multi-pass printing is performed.

FIG. 14 is a diagram schematically showing how multi-pass printing is performed in the present embodiment. Although the print head 9 employed in the present embodiment actually has 1280 ejection ports 30, FIG. 14 shows 16 ejection ports 30, nozzles N1 to N16, to simplify the illustration, and an image is printed with four print scans.

The ejection ports 30 are divided into four nozzle groups, a first nozzle group to a fourth nozzle group, each including four nozzles. In multi-pass printing, a unit region is printed by a plurality of scans. Masks are used as means for dividing image data to be printed into a plurality of pieces. A mask pattern P3 is formed by mask patterns P3*a* to P3*d* that define print permitted areas for the first to fourth nozzle groups, respectively. Unlike the example described in FIG. 6, the size of the mask patterns P3*a* to P3*d* (i.e., the size of a unit region) used in the present embodiment is a size of 4×8.

As described in the first embodiment, in a mask pattern, a black area indicates a print permitted area where printing a dot is permitted, and a white area indicates a non-print area where printing a dot is not permitted. The first to fourth mask patterns P3*a* to P3*d* have mutually complementary relations and are configured so that combining these four mask patterns completes printing of a region corresponding to 4×8 areas=32 areas. The print regions denoted by I11 to I14 show how an image is completed by a series of print scans.

Every time each print scan is complete, a print medium is conveyed intermittently in the direction indicated by the arrow in FIG. 14 by a distance corresponding to the width of a nozzle group (the width of four nozzles in FIG. 14). Thus, it is configured that an image on a single printing region (a predetermined printing region corresponding to the width of each nozzle group) on a print medium is completed by four print scans. The mask processing unit J6 performs logical ANDs on such a mask pattern and the binary image data obtained by the above-described quantization processing, and by this processing, binary print data to be printed by each print pass is determined.

In a mask pattern, the percentage of the number of print permitted areas in each print scan is defined by a printing percentage (%). Specifically, a printing percentage for each print scan is expressed by the percentage of the number of permitted areas in the print scan with the above-described region corresponding to 32 areas being set as 100%. For example, the mask patterns P3*a* to P3*d* partially include mask patterns each having an equally distributed number of print permitted areas in its print scan. Specifically, the first print scan and the fourth print scan both have a printing percentage of 16% and are thus assigned equal-distribution mask patterns. Also, the second print scan and the third print scan both have a printing percentage of 34% and are thus assigned equal-distribution mask patterns. The present embodiment describes processing using one kind of mask pattern as shown in FIG. 14. Note that the mask pattern shown in FIG. 14 is a mask pattern corresponding to the positions where dots are formed in quantization processing.

Figure 15A:
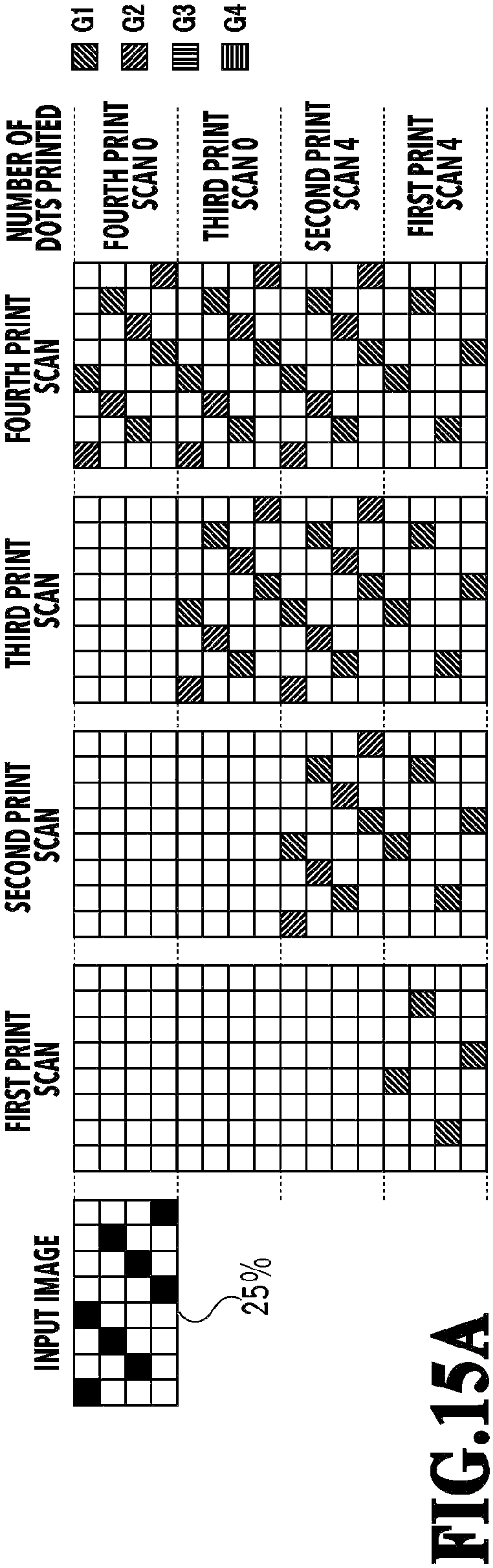
FIGS. 15A and 15B are diagrams each showing a printing percentage of each print scan based on reactive liquid data.
Figure 15B:
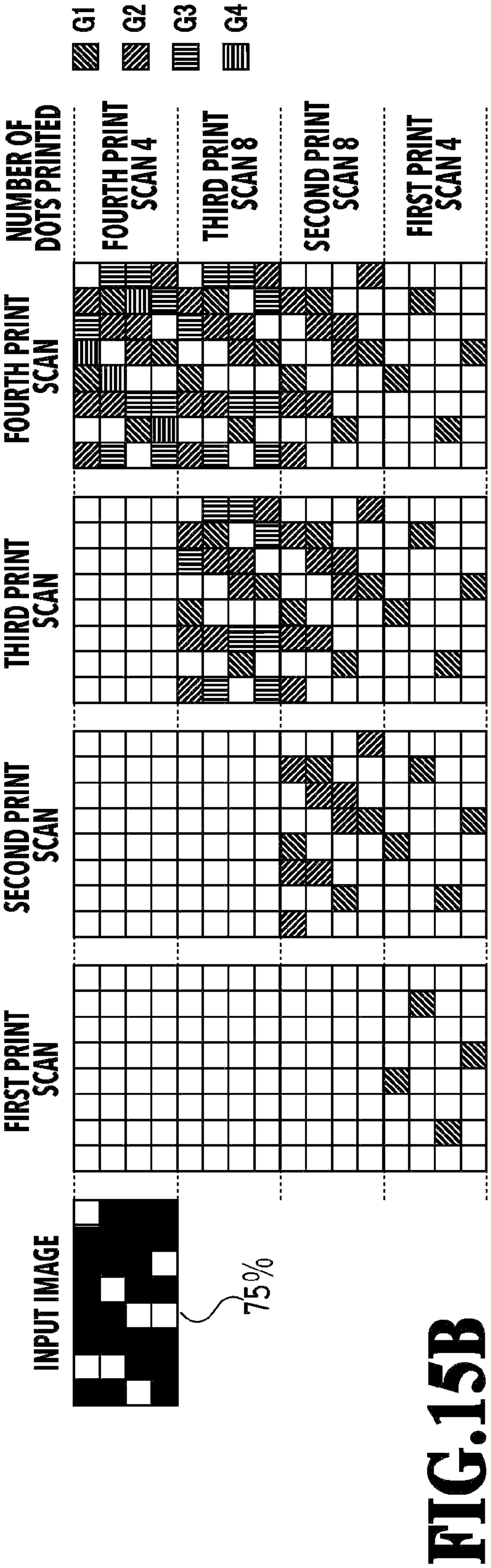

FIGS. 15A and 15B are diagrams each showing a printing percentage for each print scan based on reactive liquid data using the mask pattern in FIG. 14. In FIGS. 15A and 15B, G1 denotes a pixel printed by the first print scan, G2 denotes a pixel printed by the second print scan, G3 denotes a pixel printed by the third print scan, and G4 denotes a pixel printed by the fourth print scan.

FIG. 15A shows an example where Rct image data with a printing duty of 25% (the reactive liquid is ejected for eight pixels out of 32 pixels) is inputted, the Rct image data having been binarized by the quantization unit J5. In a case where the mask pattern in FIG. 14 is used, the reactive liquid is ejected for four pixels in the first print scan, four pixels in the second print scan, and zero pixels in the third and fourth print scans. In other words, the reactive liquid is ejected only in the first and second print scans and ejected for an equal number of pixels in the first and second print scans. In other words, the mask pattern in FIG. 14 is configured so that the positions where ON is set by the quantization processing in a case with a printing duty of 25% may be print permitted areas in the first and second print scans. Because ON is not set for dots corresponding to the print permitted areas in the third and fourth scans, as a result, nothing is printed in the third and fourth print scans.

FIG. 15B shows an example where Rct image data with a printing duty of 75% (the reactive liquid is ejected for 24 pixels out of 32 pixels) is inputted, the Rct image data having been binarized by the quantization unit J5. In a case where the mask pattern in FIG. 14 is used, the reactive liquid is ejected for four pixels in the first print scan, eight pixels in the second print scan, eight pixels in the third print scan, and four pixels in the fourth print scan. In other words, the reactive liquid is ejected in all of the first to fourth print scans, with an unequal number of times of ejection in each print scan.

Figure 16A:
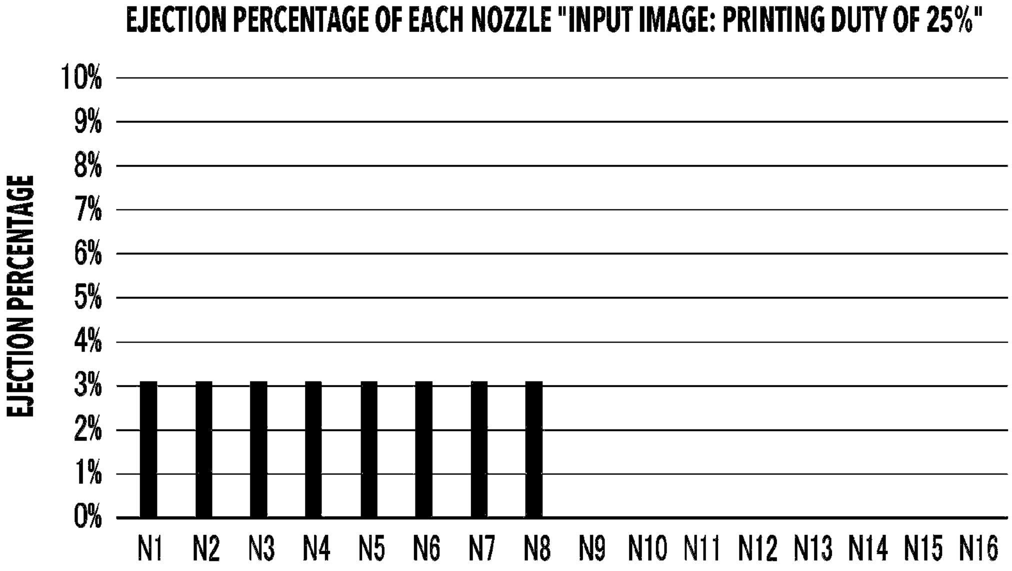
FIGS. 16A and 16B are diagrams each showing an ejection percentage of each nozzle based on reactive liquid data.
Figure 16B:
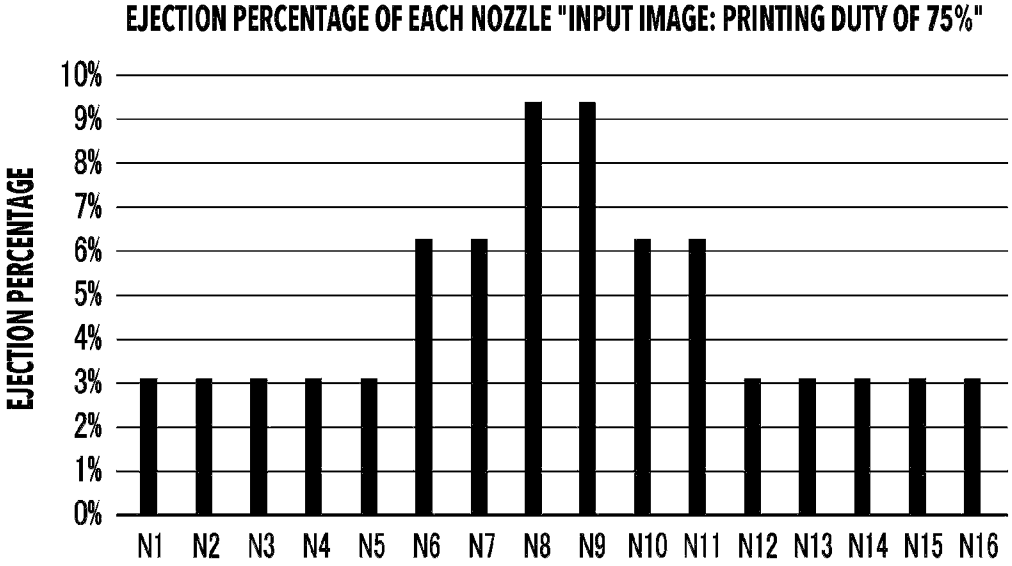

FIGS. 16A and 16B are diagrams showing the ejection percentage of each nozzle based on reactive liquid data. FIGS. 16A and 16B show the ejection percentage of each nozzle in the examples in FIGS. 15A and 15B, respectively. FIG. 16A shows an example where Rct image data binarized by the quantization unit J5 and inputted has a printing duty of 25%. As shown, the nozzles N1 to N8 eject the reactive liquid equally. Meanwhile, FIG. 16B shows an example where Rct image data with a printing duty of 75% is inputted, the Rct image data having been binarized by the quantization unit J5. As shown, the nozzles N1 to N16 eject the reactive liquid unequally. Also, in the nozzle array, nozzles at the nozzle end portions eject less reactive liquid than the ones at the nozzle center portion. Here, the nozzles at the nozzle end portions refer to nozzles at the end portions of the nozzle array, such as the nozzle N1 or the nozzle N16, and the nozzles at the nozzle center portion refer to nozzles at a center portion of the nozzle array, such as the nozzle N8 or the nozzle N9. As described in the first embodiment, in the case in FIG. 16A where the reactive liquid application amount is relatively small, the total application amount of the reactive liquid printed by the first two scans is larger than the total application amount of the reactive liquid printed by the second two scans. Then in the case in FIG. 16B where the reactive liquid application amount is relatively large, the total application amount of the reactive liquid printed by the first two scans and the total application amount of the reactive liquid printed by the second two scans are substantially equal to each other.

Also, the difference between an amount applied by the nozzle end portion and an amount applied by the nozzle center portion used in the first two scans in FIG. 16A is different from the difference between an amount applied by the nozzle end portion and an amount applied by the nozzle center portion used in the first two scans in FIG. 16B. In FIG. 16A, an amount applied by the nozzle end portion and an amount applied by the nozzle center portion used in the first two scans are equal to each other. In FIG. 16B, an amount applied by the nozzle end portion is smaller than an amount applied by the nozzle center portion used in the first two scans.

Note that the shape of the mask pattern as well as the number of dots printed and the number of times of ejection by each nozzle based on a printing duty are not limited to the ones described in the present embodiment.

As thus described, the present embodiment can print an image with less bleeding and beading by performing printing control according to the application amount of the reactive liquid by appropriately controlling the relation between quantization data and pixels in a mask pattern. Further, the present embodiment can reduce streaks occurring at a border in an image between regions having undergone different numbers of print scans.

Fifth Embodiment

The present embodiment describes an example of obtaining advantageous effects similar to those obtained by the fourth embodiment by selectively using a plurality of mask patterns according to a printing duty.

(Selecting a Mask Pattern)

FIGS. 17A to 17C are diagrams showing an example of selecting a mask based on reactive liquid data. FIG. 17A is a flowchart showing the flow of processing for selecting a mask pattern to be applied to reactive liquid image data. The processing in FIG. 17A is performed by the main control unit 300. FIG. 17B is a table showing mask selection values MPS corresponding to each pixel in reactive liquid image data. For example, the table shows an example where "1" is allocated as an MPS value to a pixel whose pixel value is from 0 to 63. An MPS value is attribute data indicating which of a plurality of kinds of mask patterns to use. FIG. 17C is a diagram showing an example of reactive liquid image data. Here, a 4×4 pixel part of the image data is extracted and shown as an example. In S1701, the main control unit 300 obtains image data. The image data obtained here is 8-bit γ-corrected RCT data obtained by the γ correction unit J4. Thus, as shown in FIG. 17C, RCT data having a 8-bit value in each pixel is obtained. In S1702, the main control unit 300 generates mask selection attribute data. Specifically, the main control unit 300 sets MPS values for the obtained image data based on FIG. 17B. FIG. 17C shows an example where corresponding MPS values are set for the respective pixels in the image data. For instance, in a case where a pixel in image data is 8-bit "16," "1" is set as its MPS value. Although image data on 4×4 pixels is shown as an example here, a MPS value is allocated to all the pixels in the target RCT data. In this way, processing is performed to generate mask selection attribute data (MPS values) from the reactive liquid image data.

(Multi-Pass Printing)

Figure 18A:
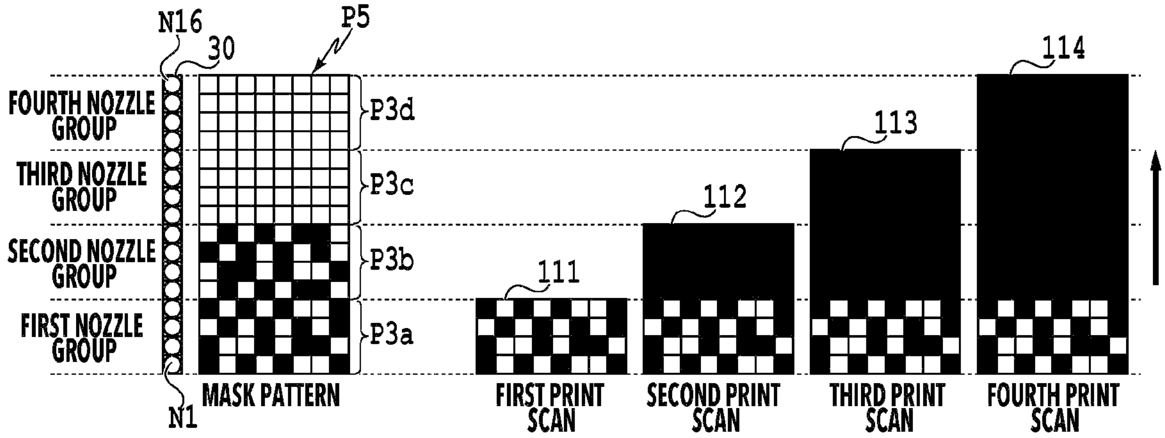
FIGS. 18A to 18C are diagrams each showing a printing percentage of each print scan based on reactive liquid data.
Figure 18B:
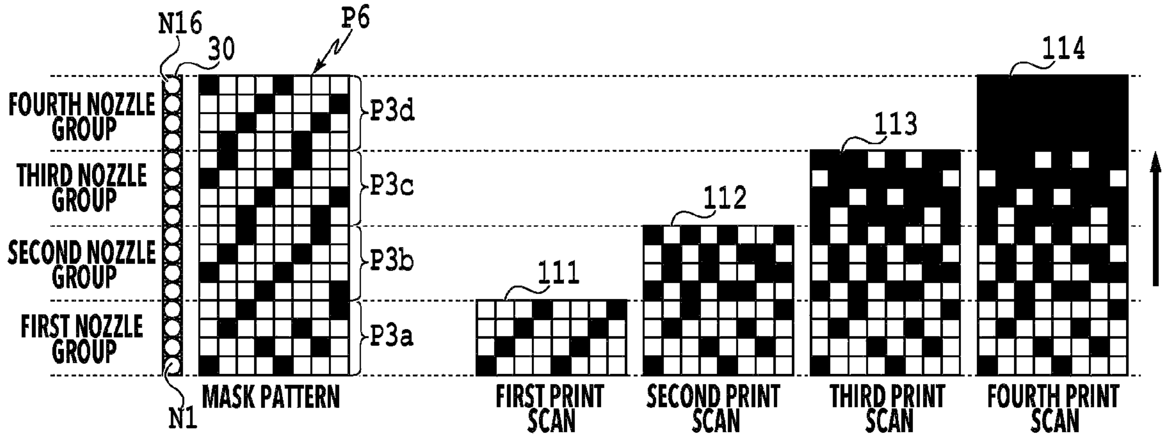
Figure 18C:
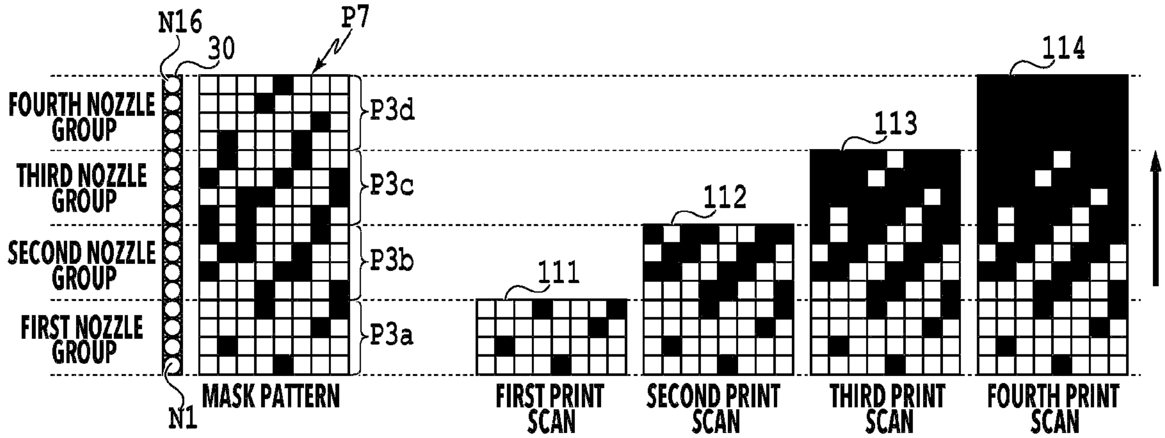

FIGS. 18A to 18C are diagrams showing a printing percentage of each print scan based on reactive liquid data. FIGS. 18A to 18C schematically show how multi-pass printing is performed based on the MPS values set in FIGS. 17A to 17C. FIG. 18A is an example of an image for which "1" is set as the MPS value, and a mask pattern P5 is selected. The mask pattern P5 is a mask pattern such that, as shown in FIG. 18A, printing is completed only by the first and second print scans, and no printing is performed by the third and fourth print scans. Using this mask pattern, printing is performed only by the first and second print scans.

FIG. 18B is an example of an image for which "2" is set as the MPS value, and a mask pattern P6 is selected. The mask pattern P6 is a mask pattern such that the printing percentage is equally distributed among the first to fourth print scans. Using this mask pattern, printing is performed by the first to fourth print scans.

FIG. 18C is an example of an image for which "3" is set as the MPS value, and a mask pattern P7 is selected. The mask pattern P7 is a mask pattern configured such that the printing percentage of the second and third print scans is higher than the printing percentage of the first and fourth print scans. Using this mask pattern, printing is performed by the first to fourth print scans.

Figure 19A:
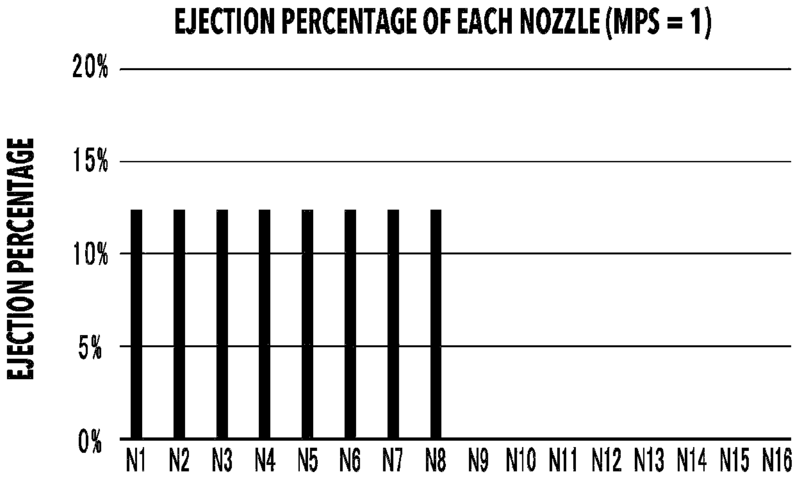
FIGS. 19A to 19C are diagrams each showing an ejection percentage of each nozzle based on reactive liquid data.
Figure 19B:
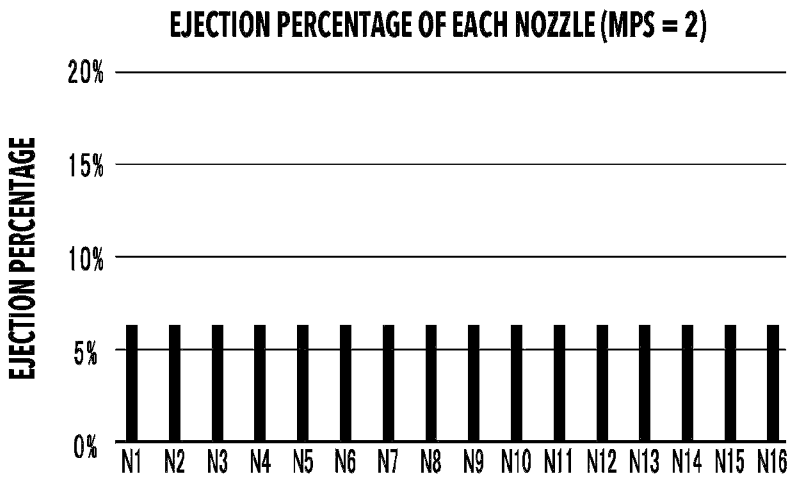
Figure 19C:
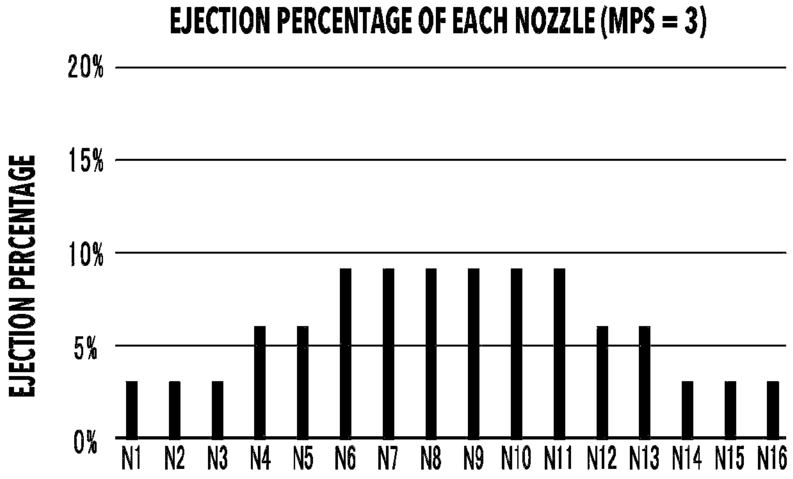

FIGS. 19A to 19C are diagrams showing the ejection percentage of each nozzle based on reactive liquid data. FIGS. 19A to 19C show the ejection percentage of each nozzle, corresponding to the examples shown in FIGS. 18A to 18C, respectively. FIG. 19A shows an example where Rct image data on an image for which "1" is set as the MPS value is inputted. As shown, the nozzles N1 to N8 eject the reactive liquid equally in this case. FIG. 19B shows an example where Rct image data on an image for which "2" is set as the MPS value is inputted. As shown, the nozzles N1 to N16 eject the reactive liquid equally in this case. FIG. 19C shows an example where Rct image data on an image for which "3" is set as the MPS value is inputted. As shown, the nozzles N1 to N16 eject the reactive liquid unequally in this case. In the nozzle array, the number of times of ejection is smaller for nozzles at the end portions than for ones at the center portion.

Note that the shape of the mask pattern as well as the number of dots printed and the number of times of ejection by each nozzle based on a printing duty are not limited to the ones described in the present embodiment.

As thus described, the present embodiment can print an image with less bleeding and beading by performing printing control according to the application amount of the reactive liquid. Further, the present embodiment can reduce streaks occurring at a border in an image between regions having undergone different numbers of print scans.

OTHER EMBODIMENTS

The embodiments described above can be employed in any appropriate combination. For example, in the third embodiment, the prior ejection printing mask M1 may be replaced by the gentle prior ejection printing mask M3 according to the type of the print medium as described in the second embodiment.

The disclosure of the present embodiments include configurations typified by the following printing apparatus examples and printing method examples.

<Configuration 1>

A printing apparatus including a first nozzle array having ejection ports configured to eject a color material ink and arranged in a sub scanning direction and a second nozzle array having ejection ports configured to eject a reactive liquid and arranged in the sub scanning direction, the printing apparatus printing an image in a predetermined region on a print medium by scanning the first nozzle array and the second nozzle array N times (where N is an integer of 2 or greater) in a main scanning direction intersecting with the sub scanning direction, the printing apparatus including a control unit configured to perform control so that out of the N scans for printing the image in the predetermined region on the print medium, a total application amount of the reactive liquid printed by first N/2 scans and a total application amount of the reactive liquid printed by second N/2 scans are different between a case where an application amount of the reactive liquid per unit area which corresponds to the predetermined region is a first amount and a case where the application amount of the reactive liquid per unit area is a second amount larger than the first amount.

<Configuration 2>

The printing apparatus according to configuration 1, in which in a case where the application amount of the reactive liquid is the first amount, the control unit performs control so that out of the N scans for printing the image in the predetermined region on the print medium, the total application amount of the reactive liquid printed by the first N/2 scans is larger than the total application amount of the reactive liquid printed by the second N/2 scans.

<Configuration 3>

The printing apparatus according to configuration 1 or 2, in which in a case where the application amount of the reactive liquid is the second amount, the control unit performs control so that out of the N scans for printing the image in the predetermined region on the print medium, the total application amount of the reactive liquid printed by the first N/2 scans is equal to the total application amount of the reactive liquid printed by the second N/2 scans.

<Configuration 4>

The printing apparatus according to any one of configurations 1 to 3, in which the printing apparatus is capable of printing an image on a first print medium or a second print medium which is more absorbent of the color material ink and the reactive liquid than the first print medium, and in a case where the application amount of the reactive liquid is the first amount, the control unit performs control so that for the second print medium, the total application amount of the reactive liquid printed by the first N/2 scans out of the N scans for printing the image in the predetermined region on the second print medium is smaller than in a case of using the first print medium.

<Configuration 5>

The printing apparatus according to configuration 4, in which in a case where the application amount of the reactive liquid is the second amount, the control unit performs control so that for either one of the first print medium and the second print medium, the total application amount of the reactive liquid printed by the first N/2 scans out of the N scans for printing the image in the predetermined region on the print medium is equal to the total application amount of the reactive liquid printed by the second N/2 scans.

<Configuration 6>

A printing apparatus including a first nozzle array having ejection ports configured to eject a color material ink and arranged in a sub scanning direction and a second nozzle array and a third nozzle array each having ejection ports configured to eject a reactive liquid and arranged in the sub scanning direction, the printing apparatus printing an image in a predetermined region on a print medium by scanning the first nozzle array, the second nozzle array, and the third nozzle array N times (where N is an integer of 2 or greater) in a main scanning direction intersecting with the sub scanning direction, the printing apparatus including a control unit configured to perform control so that in a case where the application amount of the reactive liquid to the predetermined region is a first amount, the application amount of the reactive liquid by the second nozzle array is larger than that by the third nozzle array, in a case where the application amount of the reactive liquid to the predetermined region is a second amount which is larger than the first amount, the application amount of the reactive liquid by the third nozzle array is larger than that by the second nozzle array, and out of the N scans with which the second nozzle array and the third nozzle array print the image in the predetermined region on the print medium, a total application amount of the reactive liquid printed by first N/2 scans and a total application amount of the reactive liquid printed by second N/2 scans are different between the second nozzle array and the third nozzle array.

<Configuration 7>

The printing apparatus according to configuration 6, in which the control unit preforms control so that, out of the N scans with which the second nozzle array prints the image in the predetermined region on the print medium, the total application amount of the reactive liquid printed by the first N/2 scans is larger than the total application amount of the reactive liquid printed by the second N/2 scans.

<Configuration 8>

The printing apparatus according to configuration 6 or 7, in which the control unit preforms control so that, out of the N scans with which the third nozzle array prints the image in the predetermined region on the print medium, the total application amount of the reactive liquid printed by the first N/2 scans is equal to the total application amount of the reactive liquid printed by the second N/2 scans.

<Configuration 9>

The printing apparatus according to any one of configurations 1 to 8, in which the control unit performs the control through mask processing using a mask pattern.

<Configuration 10>

The printing apparatus according to configuration 9, in which the control unit performs the mask processing using a first mask defining that printing of the predetermined region is completed by the first N/2 scans out of the N scans and a second mask defining that printing of the predetermined region is completed by N scans out of the N scans.

<Configuration 11>

The printing apparatus according to configuration 10, in which the control unit determines an application amount of the reactive liquid based on target image data to be printed in the predetermined region, based on the determined application amount of the reactive liquid, the control unit determines mask selection data for selecting a mask pattern to use in the mask processing, and based on the mask selection data, the control unit determines a mask pattern to use in the mask processing for the predetermined region from the first mask or the second mask.

<Configuration 12>

The printing apparatus according to configuration 11, in which as the mask pattern to use for the mask processing on the predetermined region, the control unit determines a mask pattern obtained by determining a value corresponding to a value in a target area in the mask selection data from a value of the same area as the target area in the first mask and the second mask.

<Configuration 13>

The printing apparatus according to any one of configurations 1 to 3, in which the control unit performs control so that a difference between an application amount by a nozzle end portion of the second nozzle array and an application amount by a nozzle center portion of the second nozzle array in printing of the total application amount of the reactive liquid by the first N/2 scans on the print medium in a case of the first amount is different from a difference between an application amount by the nozzle end portion of the second nozzle array and an application amount by the nozzle center portion of the second nozzle array in printing of the total application amount of the reactive liquid by the first N/2 scans on the print medium in a case of the second amount.

<Configuration 14>

The printing apparatus according to configuration 13, in which in a case where the application amount of the reactive liquid is the first amount, the control unit performs control so that in the printing of the total application amount of the reactive liquid by the first N/2 scans on the print medium, the application amount by the nozzle end portion of the second nozzle array is equal to the application amount by the nozzle center portion of the second nozzle array.

<Configuration 15>

The printing apparatus according to configuration 13, in which in a case where the application amount of the reactive liquid is the second amount, the control unit performs control so that in the printing of the total application amount of the reactive liquid by the first N/2 scans on the print medium, the application amount by the nozzle end portion of the second nozzle array is smaller than the application amount by the nozzle center portion of the second nozzle array.

<Configuration 16>

A printing method for a printing apparatus including a first nozzle array having ejection ports configured to eject a color material ink and arranged in a sub scanning direction and a second nozzle array having ejection ports configured to eject a reactive liquid and arranged in the sub scanning direction, the printing method printing an image in a predetermined region on a print medium by scanning the first nozzle array and the second nozzle array N times (where N is an integer of 2 or greater) in a main scanning direction intersecting with the sub scanning direction, the printing method including performing control so that out of the N scans for printing the image in the predetermined region on the print medium, a total application amount of the reactive liquid printed by first N/2 scans and a total application amount of the reactive liquid printed by second N/2 scans are different between a case where an application amount of the reactive liquid per unit area which corresponds to the predetermined region is a first amount and a case where the application amount of the reactive liquid per unit area is a second amount larger than the first amount.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-185117, filed Nov. 12, 2021 and Japanese Patent Application No. 2022-089481, filed Jun. 1, 2022, which are hereby incorporated by reference wherein in their entirety.

What is claimed is:

1. A printing apparatus including a first nozzle array having ejection ports configured to eject a color material ink and arranged in a sub scanning direction and a second nozzle array having ejection ports configured to eject a reactive liquid and arranged in the sub scanning direction, the printing apparatus printing an image in a predetermined region on a print medium by scanning the first nozzle array and the second nozzle array N times (where N is an integer of 2 or greater) in a main scanning direction intersecting with the sub scanning direction, the printing apparatus comprising a control unit configured to perform control so that out of the N scans for printing the image in the predetermined region on the print medium, a total application amount of the reactive liquid printed by first N/2 scans and a total application amount of the reactive liquid printed by second N/2 scans are different between a case where an application amount of the reactive liquid per unit area which corresponds to the predetermined region is a first amount and a case where the application amount of the reactive liquid per unit area is a second amount larger than the first amount.

2. The printing apparatus according to claim 1, wherein in a case where the application amount of the reactive liquid is the first amount, the control unit performs control so that out of the N scans for printing the image in the predetermined region on the print medium, the total application amount of the reactive liquid printed by the first N/2 scans is larger than the total application amount of the reactive liquid printed by the second N/2 scans.

3. The printing apparatus according to claim 1, wherein in a case where the application amount of the reactive liquid is the second amount, the control unit performs control so that out of the N scans for printing the image in the predetermined region on the print medium, the total application amount of the reactive liquid printed by the first N/2 scans is equal to the total application amount of the reactive liquid printed by the second N/2 scans.

4. The printing apparatus according to claim 1, wherein the printing apparatus is capable of printing an image on a first print medium or a second print medium which is more absorbent of the color material ink and the reactive liquid than the first print medium, and in a case where the application amount of the reactive liquid is the first amount, the control unit performs control so that for the second print medium, the total application amount of the reactive liquid printed by the first N/2 scans out of the N scans for printing the image in the predetermined region on the second print medium is smaller than in a case of using the first print medium.

5. The printing apparatus according to claim 4, wherein in a case where the application amount of the reactive liquid is the second amount, the control unit performs control so that for either one of the first print medium and the second print medium, the total application amount of the reactive liquid printed by the first N/2 scans out of the N scans for printing the image in the predetermined region on the print medium is equal to the total application amount of the reactive liquid printed by the second N/2 scans.

6. A printing apparatus including a first nozzle array having ejection ports configured to eject a color material ink and arranged in a sub scanning direction and a second nozzle array and a third nozzle array each having ejection ports configured to eject a reactive liquid and arranged in the sub scanning direction, the printing apparatus printing an image in a predetermined region on a print medium by scanning the first nozzle array, the second nozzle array, and the third nozzle array N times (where N is an integer of 2 or greater) in a main scanning direction intersecting with the sub scanning direction, the printing apparatus comprising a control unit configured to perform control so that in a case where the application amount of the reactive liquid to the predetermined region is a first amount, the application amount of the reactive liquid by the second nozzle array is larger than that by the third nozzle array, in a case where the application amount of the reactive liquid to the predetermined region is a second amount which is larger than the first amount, the application amount of the reactive liquid by the third nozzle array is larger than that by the second nozzle array, and out of the N scans with which the second nozzle array and the third nozzle array print the image in the predetermined region on the print medium, a total application amount of the reactive liquid printed by first N/2 scans and a total application amount of the reactive liquid printed by second N/2 scans are different between the second nozzle array and the third nozzle array.

7. The printing apparatus according to claim 6, wherein the control unit preforms control so that, out of the N scans with which the second nozzle array prints the image in the predetermined region on the print medium, the total application amount of the reactive liquid printed by the first N/2 scans is larger than the total application amount of the reactive liquid printed by the second N/2 scans.

8. The printing apparatus according to claim 6, wherein the control unit preforms control so that, out of the N scans with which the third nozzle array prints the image in the predetermined region on the print medium, the total application amount of the reactive liquid printed by the first N/2 scans is equal to the total application amount of the reactive liquid printed by the second N/2 scans.

9. The printing apparatus according to claim 1, wherein the control unit performs the control through mask processing using a mask pattern.

10. The printing apparatus according to claim 9, wherein the control unit performs the mask processing using a first mask defining that printing of the predetermined region is completed by the first N/2 scans out of the N scans and a second mask defining that printing of the predetermined region is completed by N scans out of the N scans.

11. The printing apparatus according to claim 10, wherein the control unit determines an application amount of the reactive liquid based on target image data to be printed in the predetermined region, based on the determined application amount of the reactive liquid, the control unit determines mask selection data for selecting a mask pattern to use in the mask processing, and based on the mask selection data, the control unit determines a mask pattern to use in the mask processing for the predetermined region from the first mask or the second mask.

12. The printing apparatus according to claim 11, wherein as the mask pattern to use for the mask processing on the predetermined region, the control unit determines a mask pattern obtained by determining a value corresponding to a value in a target area in the mask selection data from a value of the same area as the target area in the first mask and the second mask.

13. The printing apparatus according to claim 1, wherein the control unit performs control so that a difference between an application amount by a nozzle end portion of the second nozzle array and an application amount by a nozzle center portion of the second nozzle array in printing of the total application amount of the reactive liquid by the first N/2 scans on the print medium in a case of the first amount is different from a difference between an application amount by the nozzle end portion of the second nozzle array and an application amount by the nozzle center portion of the second nozzle array in printing of the total application amount of the reactive liquid by the first N/2 scans on the print medium in a case of the second amount.

14. The printing apparatus according to claim 13, wherein in a case where the application amount of the reactive liquid is the first amount, the control unit performs control so that in the printing of the total application amount of the reactive liquid by the first N/2 scans on the print medium, the application amount by the nozzle end portion of the second nozzle array is equal to the application amount by the nozzle center portion of the second nozzle array.

15. The printing apparatus according to claim 13, wherein in a case where the application amount of the reactive liquid is the second amount, the control unit performs control so that in the printing of the total application amount of the reactive liquid by the first N/2 scans on the print medium, the application amount by the nozzle end portion of the second nozzle array is smaller than the application amount by the nozzle center portion of the second nozzle array.

16. A printing method for a printing apparatus including a first nozzle array having ejection ports configured to eject a color material ink and arranged in a sub scanning direction and a second nozzle array having ejection ports configured to eject a reactive liquid and arranged in the sub scanning direction, the printing method printing an image in a predetermined region on a print medium by scanning the first nozzle array and the second nozzle array N times (where N is an integer of 2 or greater) in a main scanning direction intersecting with the sub scanning direction, the printing method comprising performing control so that out of the N scans for printing the image in the predetermined region on the print medium, a total application amount of the reactive liquid printed by first N/2 scans and a total application amount of the reactive liquid printed by second N/2 scans are different between a case where an application amount of the reactive liquid per unit area which corresponds to the predetermined region is a first amount and a case where the application amount of the reactive liquid per unit area is a second amount larger than the first amount.

* * * * *